US011719351B2

(12) United States Patent
Quintana

(10) Patent No.: US 11,719,351 B2
(45) Date of Patent: Aug. 8, 2023

(54) PNEUMATIC VALVE SYSTEM AND METHODS OF USING THE SAME

(71) Applicant: John Quintana, Camarillo, CA (US)

(72) Inventor: John Quintana, Camarillo, CA (US)

( * ) Notice: Subject to any disclaimer, the term of this patent is extended or adjusted under 35 U.S.C. 154(b) by 0 days.

(21) Appl. No.: 17/160,320

(22) Filed: Jan. 27, 2021

(65) Prior Publication Data

US 2021/0285556 A1 Sep. 16, 2021

Related U.S. Application Data

(60) Provisional application No. 62/966,172, filed on Jan. 27, 2020.

(51) Int. Cl.
*F16K 15/04* (2006.01)
*B60C 29/00* (2006.01)
*B60C 29/06* (2006.01)
*F16K 15/20* (2006.01)

(52) U.S. Cl.
CPC .......... *F16K 15/044* (2013.01); *B60C 29/005* (2013.01); *B60C 29/06* (2013.01); *F16K 15/20* (2013.01); *Y10T 137/3724* (2015.04)

(58) Field of Classification Search
CPC .. F04B 33/005; B60C 29/06; Y10T 137/3724; Y10T 137/87957
See application file for complete search history.

(56) References Cited

U.S. PATENT DOCUMENTS

| 499,956 | A | 6/1893 | Berry |
| 505,486 | A | 9/1893 | Schrader |
| 670,725 | A | 3/1901 | Pickett |

(Continued)

FOREIGN PATENT DOCUMENTS

| CN | 204095150 U | 1/2015 |
| DE | 10253445 A1 | 6/2004 |

(Continued)

OTHER PUBLICATIONS

Print out of Entech Instruments Silonite MicroValves brochure retreived Jul. 30, 2021 from "https://www.entechinst.com/download/silonite-microvalves/?ind=1571766962175&filename=MicroValves-LowRes_102119.pdf&wpdmdl=27952&refresh=610457794ccca1627674489&open=pdf".
Print out of RAVEqc Quick Connect Air Valves brochure retreived Jul. 30, 2021 from "https://www.restek.com/globalassets/pim-media/instruction-sheets/500-19-002.pdf".
Ball Check Valves—Ball Poppet Valves—Ball and Seat Valves—Ball Valves—Diamond Impregnated Lapping Ball—Diamond Impregnated Lapping Ball on a Stem, retrieved on Jun. 30, 2021 from "https://web.archive.org/web/20180928062944/http://precisionballs.com/ball_valve.php".

(Continued)

*Primary Examiner* — Robert K Arundale
(74) *Attorney, Agent, or Firm* — McCarter & English, LLP; Dave S. Christensen

(57) ABSTRACT

The present invention provides a pneumatic valve system for easily attaching and sealing a valve coupler to a valve stem for filling an inflatable vessel such as a tire, tube, mattress, etc. The valve system may comprise the following major components: a valve stem, a valve cap with a pin passage and attachment structure for attaching to a valve coupler, a sealing member, a biasing member, the valve coupler comprising a coupler housing, a pin seat, an inflation pin, and a collar with ball bearings complementary to the attachment structure of the valve cap, and an elastic sleeve for providing inward force against the ball bearings. The valve system may allow for easy, secure, and sealed engagement between the valve coupler and valve stem by simply pushing down on the valve coupler, and disengagement by pulling up on the valve coupler with as little as two fingers.

17 Claims, 17 Drawing Sheets

(56) References Cited

U.S. PATENT DOCUMENTS

| | | | | |
|---|---|---|---|---|
| 1,114,937 | A * | 10/1914 | Tessner | F16K 15/20 |
| | | | | 152/429 |
| 1,353,415 | A | 9/1920 | Newsom et al. | |
| 1,356,457 | A | 10/1920 | Mapel | |
| 1,671,123 | A | 5/1928 | Payne | |
| 1,740,173 | A * | 12/1929 | Hasting | F16K 15/20 |
| | | | | 137/232 |
| 2,057,195 | A | 10/1936 | Arthur | |
| 2,064,695 | A | 12/1936 | Sipe | |
| 2,082,972 | A | 6/1937 | Perry | |
| 2,178,828 | A * | 11/1939 | Broecker | B60C 29/06 |
| | | | | 137/233 |
| 2,825,527 | A | 3/1958 | Wendell | |
| 2,928,448 | A | 3/1960 | Hosking | |
| 2,939,478 | A * | 6/1960 | Dockrell | F16K 15/20 |
| | | | | 251/50 |
| 3,007,483 | A | 11/1961 | Keefe | |
| 3,180,349 | A * | 4/1965 | Steer | B60C 29/02 |
| | | | | 137/234.5 |
| 3,315,695 | A * | 4/1967 | Boyer | F16K 15/20 |
| | | | | 137/232 |
| 3,442,316 | A | 5/1969 | McMaster | |
| 3,465,780 | A | 9/1969 | Duymelinck et al. | |
| 4,182,370 | A * | 1/1980 | Karcher | F16L 37/23 |
| | | | | 137/231 |
| 4,445,527 | A * | 5/1984 | Leimbach | B60C 23/0496 |
| | | | | 137/115.17 |
| 4,462,449 | A | 7/1984 | Zabel | |
| 4,506,862 | A * | 3/1985 | Spinosa | F16L 37/42 |
| | | | | 285/376 |
| 5,012,954 | A | 5/1991 | Will | |
| 5,054,511 | A | 10/1991 | Tuan et al. | |
| 5,211,197 | A * | 5/1993 | Marrison | F16L 37/23 |
| | | | | 137/614 |
| 5,398,744 | A | 3/1995 | Street et al. | |
| 5,479,975 | A | 1/1996 | Fogal et al. | |
| 5,544,858 | A * | 8/1996 | Rogers | F16L 37/38 |
| | | | | 251/149.6 |
| 5,694,969 | A | 12/1997 | Devuyst | |
| 5,713,386 | A * | 2/1998 | Heredia Batista | F16K 15/20 |
| | | | | 137/227 |
| 5,762,095 | A | 6/1998 | Gapinski et al. | |
| 6,032,691 | A | 3/2000 | Powell et al. | |
| 6,035,885 | A | 3/2000 | Schuessler et al. | |
| 6,102,064 | A | 8/2000 | Robinson | |
| 6,454,892 | B1 | 9/2002 | Gerresheim et al. | |
| 6,651,689 | B1 | 11/2003 | Stech | |
| 6,672,328 | B2 * | 1/2004 | Colussi | B60C 23/00354 |
| | | | | 137/102 |
| 6,904,932 | B1 | 6/2005 | Haraughty | |
| 8,646,477 | B2 | 2/2014 | Wen | |
| 9,206,916 | B1 * | 12/2015 | Wang | F04B 33/00 |
| 9,759,337 | B2 | 9/2017 | Cassiman et al. | |
| 10,562,361 | B2 | 2/2020 | Chang | |
| 10,563,782 | B2 | 2/2020 | Moore | |
| 10,807,424 | B2 | 10/2020 | Teixeira, IV | |
| D903,719 | S | 12/2020 | DeBaker et al. | |
| 10,926,591 | B2 | 2/2021 | Courtney et al. | |
| 11,179,979 | B2 | 11/2021 | Kobler et al. | |
| 11,338,632 | B2 | 5/2022 | Courtney et al. | |
| 2003/0032507 | A1 | 2/2003 | Lacroix et al. | |
| 2005/0000568 | A1 * | 1/2005 | Nikolayev | F16L 37/23 |
| | | | | 137/231 |
| 2005/0028865 | A1 | 2/2005 | Nikolaev et al. | |
| 2006/0021472 | A1 | 2/2006 | Ragan et al. | |
| 2011/0011217 | A1 | 1/2011 | Kojima | |
| 2011/0277877 | A1 | 11/2011 | Stehle | |
| 2012/0067038 | A1 | 3/2012 | Becocci | |
| 2012/0234401 | A1 * | 9/2012 | Wu | F04B 33/005 |
| | | | | 137/231 |
| 2015/0247594 | A1 | 9/2015 | Vijayadevaraj | |
| 2015/0298516 | A1 * | 10/2015 | Purisch | F04B 33/005 |
| | | | | 137/231 |
| 2015/0343723 | A1 | 12/2015 | Takahara | |
| 2016/0347011 | A1 | 12/2016 | Wang | |
| 2017/0057309 | A1 | 3/2017 | Kobler et al. | |
| 2017/0276277 | A1 * | 9/2017 | Wang | F04B 33/00 |
| 2018/0126963 | A1 | 5/2018 | Kobler et al. | |
| 2018/0333927 | A1 | 11/2018 | Spindler | |
| 2019/0210416 | A1 | 7/2019 | Teixeira | |
| 2020/0148177 | A1 | 5/2020 | Kobler et al. | |
| 2020/0368980 | A1 | 11/2020 | Dowel | |
| 2020/0408314 | A1 | 12/2020 | Sugino | |
| 2021/0323363 | A1 | 10/2021 | Courtney et al. | |

FOREIGN PATENT DOCUMENTS

| | | |
|---|---|---|
| DE | 10336959 A1 | 2/2005 |
| DE | 10337687 A1 | 3/2005 |
| DE | 19549592 C5 | 12/2006 |
| DE | 202008007517 U1 | 8/2008 |
| DE | 102007053241 A1 | 5/2009 |
| DE | 102008061311 A1 | 6/2010 |
| DE | 102011018927 A1 | 10/2012 |
| DE | 102015203972 A1 | 9/2016 |
| DE | 102015119917 A1 | 5/2017 |
| EP | 0753420 B1 | 10/2001 |
| EP | 1419876 A2 | 5/2004 |
| EP | 2261011 A1 | 12/2010 |
| EP | 2217431 B1 | 12/2013 |
| EP | 2618993 B1 | 12/2014 |
| FR | 3066437 B1 | 4/2021 |
| JP | 5321726 B1 | 10/2013 |
| JP | 5384317 B2 | 1/2014 |
| KR | 20030081782 A | 10/2003 |
| TW | M564673 U | 8/2018 |
| TW | M575491 U | 3/2019 |
| WO | 2018210836 A1 | 11/2018 |
| WO | 2019023758 A1 | 2/2019 |
| WO | 2020215015 A1 | 10/2020 |

OTHER PUBLICATIONS

International Search Report and Written Opinion for PCT/US2021/015338.

English abstract of foreign patent document EP1419876A2 accessed Apr. 15, 2022 at "https://worldwide.espacenet.com/patent/search/family/032115547/publication/EP1419876A2?q=pn%3DEP1419876A2".

English abstract of foreign patent document TWM575491U accessed Apr. 15, 2022 at "https://patents.google.com/patent/TWM575491U/en?oq=TWM575491U".

English abstract of foreign patent document KR20030081782A accessed Apr. 15, 2022 at "https://worldwide.espacenet.com/patent/search/family/032378866/publication/KR20030081782A?q=pn%3DKR20030081782A".

English abstract of foreign patent document WO2018210836A1 accessed Apr. 15, 2022 at "https://worldwide.espacenet.com/patent/search/family/059649852/publication/WO2018210836A1?q=pn%3DWO2018210836A1".

English abstract of foreign patent document DE10336959A1 accessed Apr. 15, 2022 at "https://patents.google.com/patent/DE10336959A1/en?oq=de10336959A1".

English abstract of foreign patent document DE10337687A1 accessed Apr. 15, 2022 at "https://patents.google.com/patent/DE10337687A1/en?oq=de10337687A1".

English abstract of foreign patent document DE202008007517U1 accessed Apr. 15, 2022 at "https://patents.google.com/patent/DE202008007517U1/en?oq=de202008007517u1".

English abstract of foreign patent document EP2217431B1 accessed Apr. 15, 2022 at "https://patents.google.com/patent/EP2217431B1/en?oq=ep2217431b1".

English abstract of foreign patent document CN204095150U accessed Apr. 15, 2022 at "https://patents.google.com/patent/CN204095150U/en?oq=cn204095150u".

English abstract of foreign patent document DE102015203972A1 accessed Apr. 15, 2022 at "https://patents.google.com/patent/DE102015203972A1/en?oq=de102015203972a1".

(56) References Cited

OTHER PUBLICATIONS

English abstract of foreign patent document JP5384317B2 accessed Apr. 15, 2022 at "https://patents.google.com/patent/JP5384317B2/en?oq=jp5384317b2".
Google Patent record of GB9212814D0 accessed Apr. 15, 2022 at "https://patents.google.com/patent/GB9212814D0/en?oq=gb9212814".
English abstract of foreign patent document DE19549592C5 accessed Apr. 15, 2022 at "https://patents.google.com/patent/DE19549592C5/en?oq=de19549592C5".
English abstract of foreign patent document DE10253445A1 accessed Apr. 15, 2022 at "https://patents.google.com/patent/DE10253445A1/en?oq=de10253445a1".
English abstract of foreign patent document DE102007053241A1 accessed Apr. 15, 2022 at "https://patents.google.com/patent/DE102007053241A1/en?oq=de102007053241a1".
English abstract of foreign patent document DE102008061311A1 accessed Apr. 15, 2022 at "https://patents.google.com/patent/DE102008061311A1/en?oq=de102008061311a1".
English abstract of foreign patent document DE102011018927A1 accessed Apr. 15, 2022 at "https://patents.google.com/patent/DE102011018927A1/en?oq=de102011018927a1".
English abstract of foreign patent document JP5321726B1 accessed Apr. 15, 2022 at "https://patents.google.com/patent/JP5321726B1/en?oq=jp5321726b1".
English abstract of foreign patent document DE102015119917A1 accessed Apr. 15, 2022 at "https://patents.google.com/patent/DE102015119917A1/en?oq=de102015119917a1".
English abstract of foreign patent document FR3066437B1 accessed Apr. 15, 2022 at "https://patents.google.com/patent/FR3066437B1/en?oq=fr3066437b1".
English abstract of foreign patent document TWM564673U accessed Apr. 15, 2022 at "https://patents.google.com/patent/TWM564673U/en?oq=twm564673u".
Print out of Wikipedia Dunlap Valve Article retreived Feb. 17, 2022 from "https://en.wikipedia.org/wiki/Dunlop_valve".

* cited by examiner

FIG. 1A
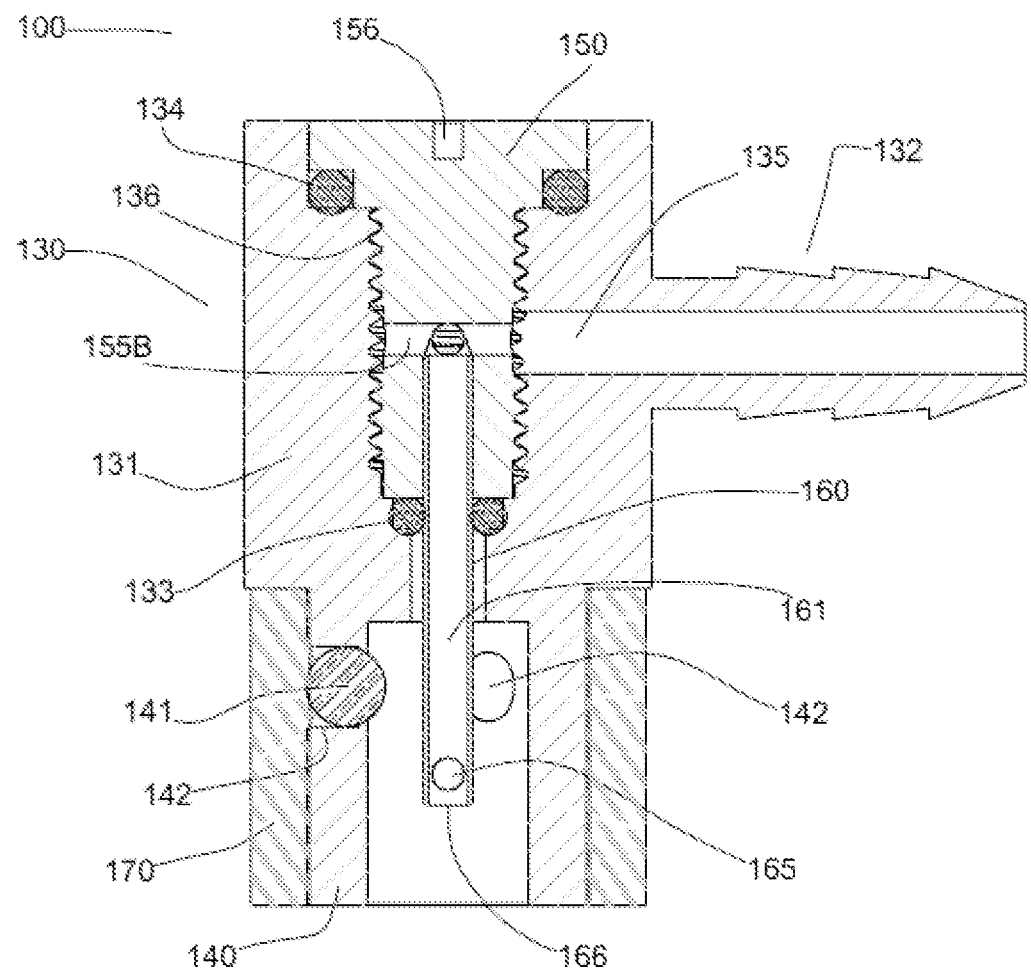
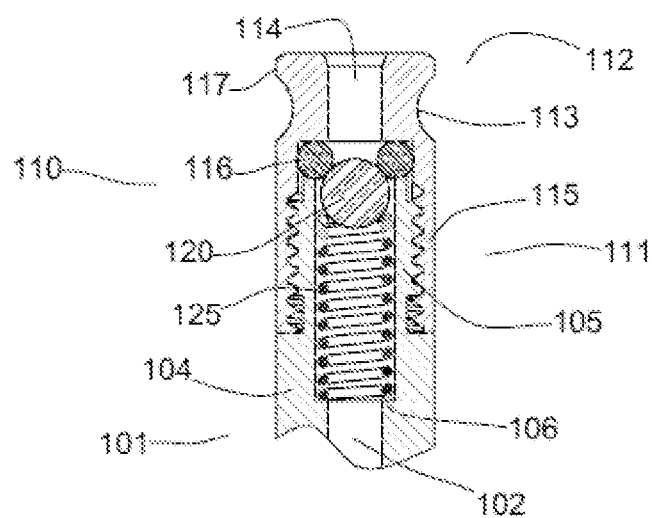

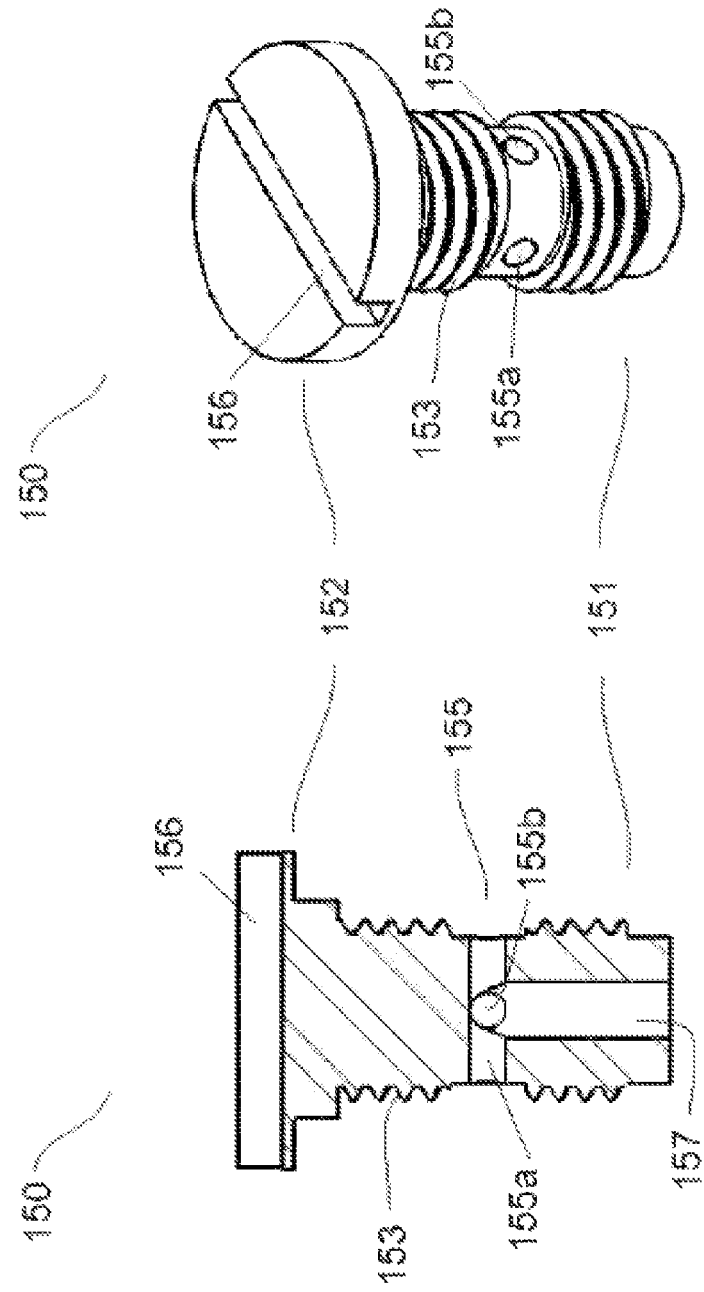

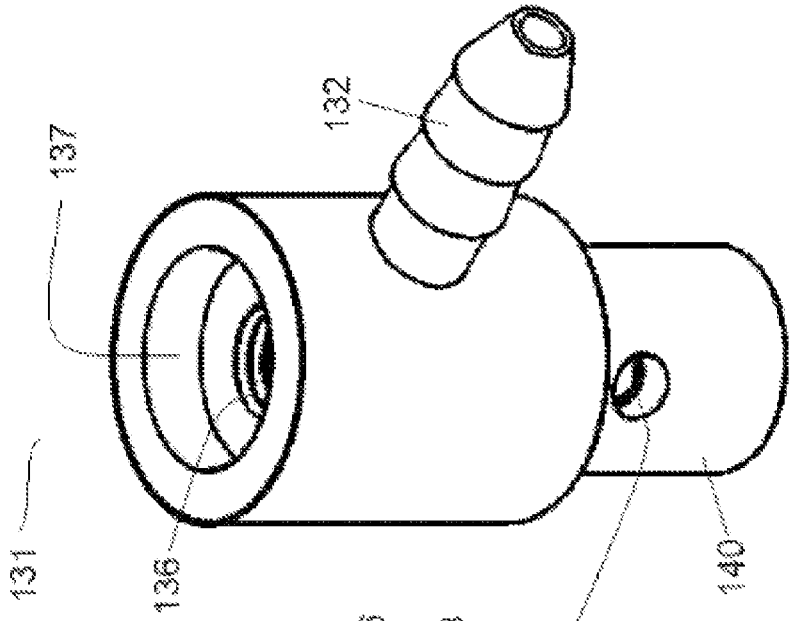
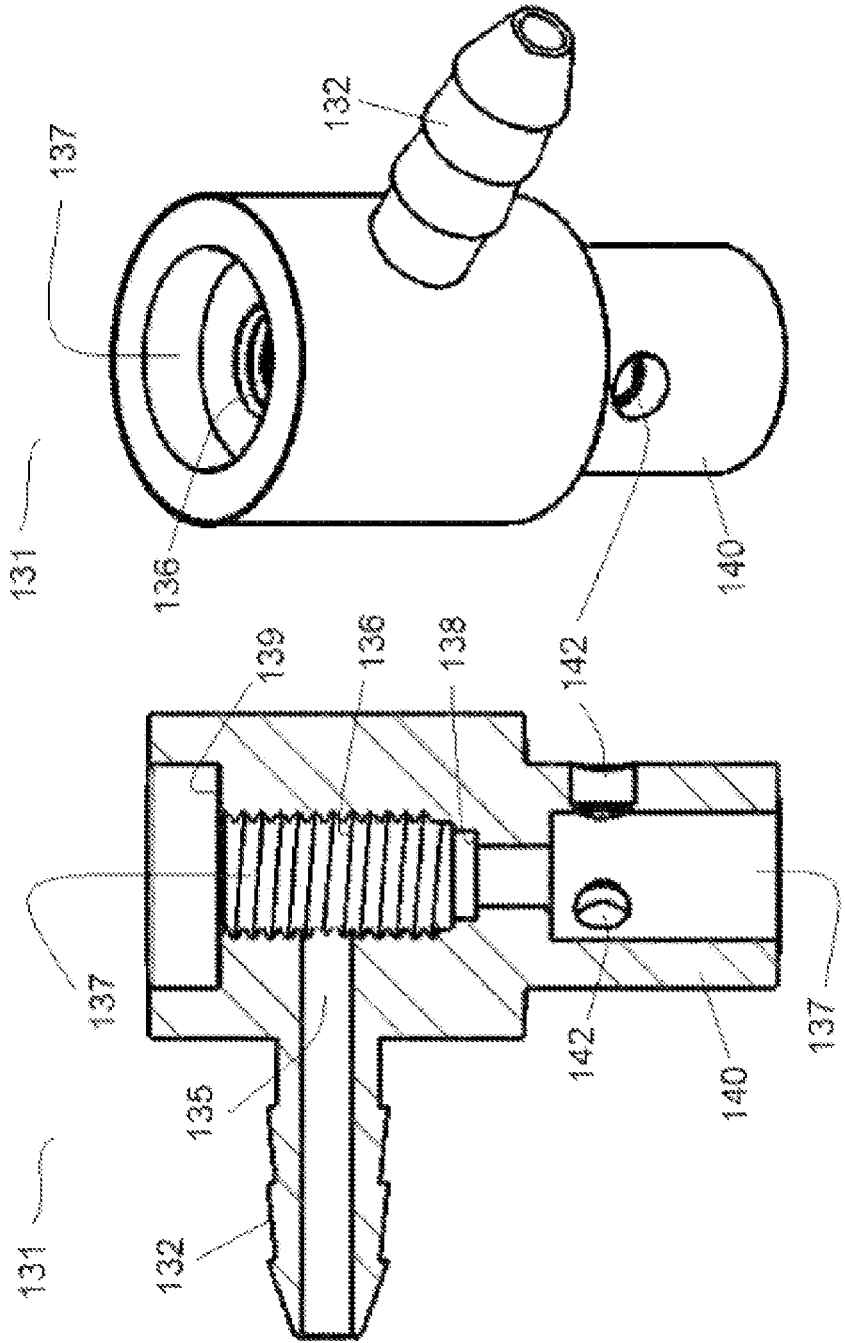

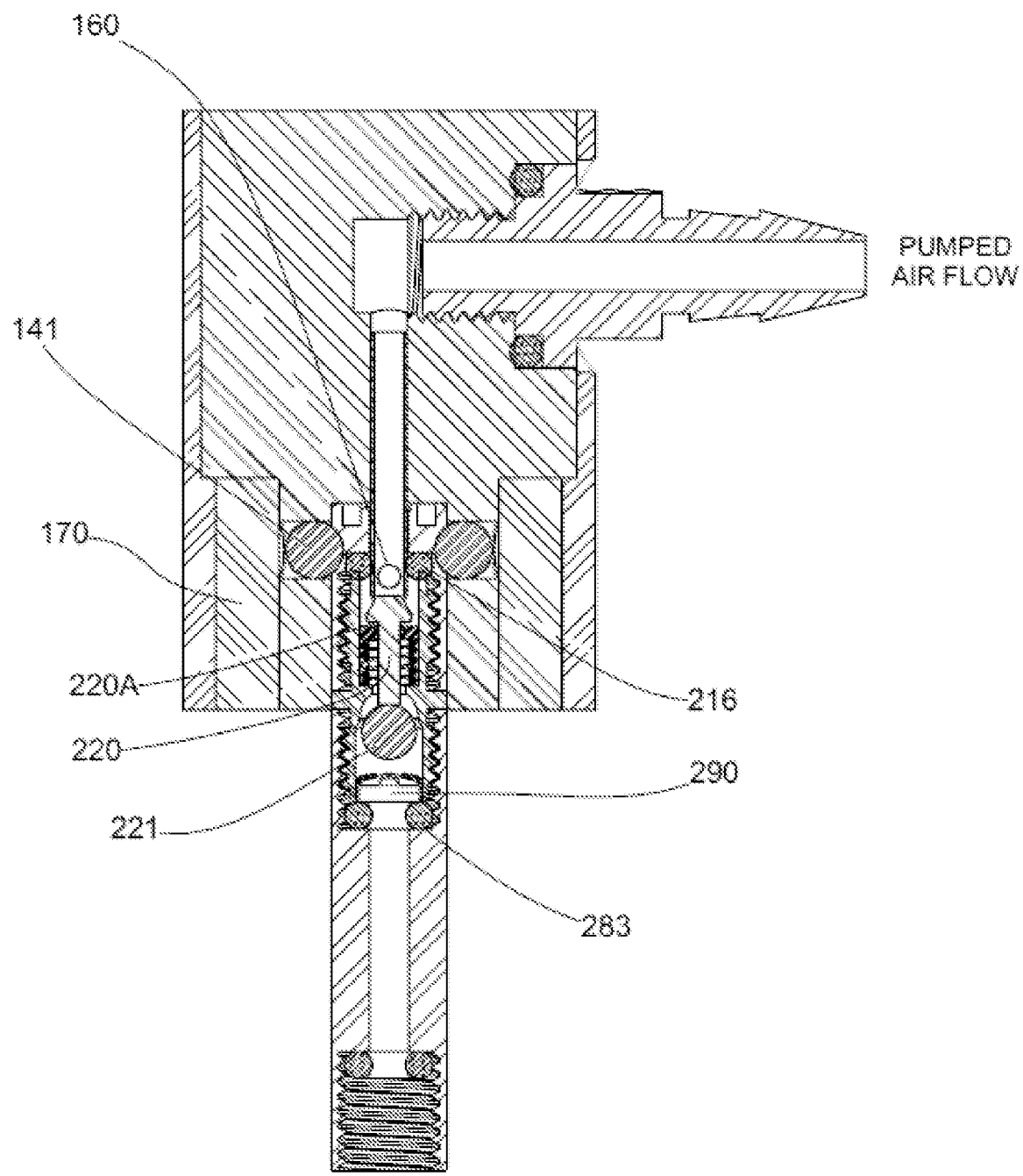

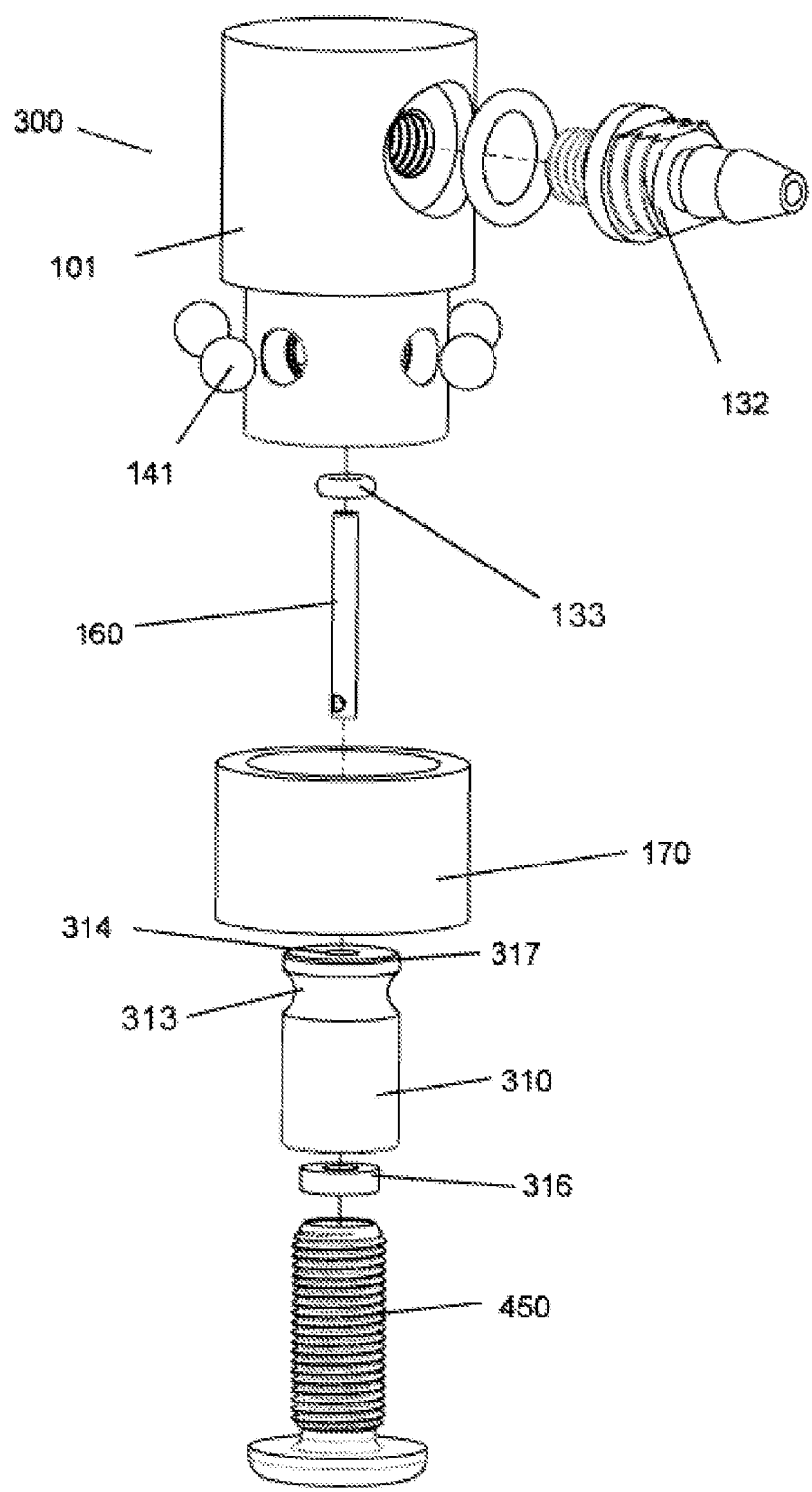

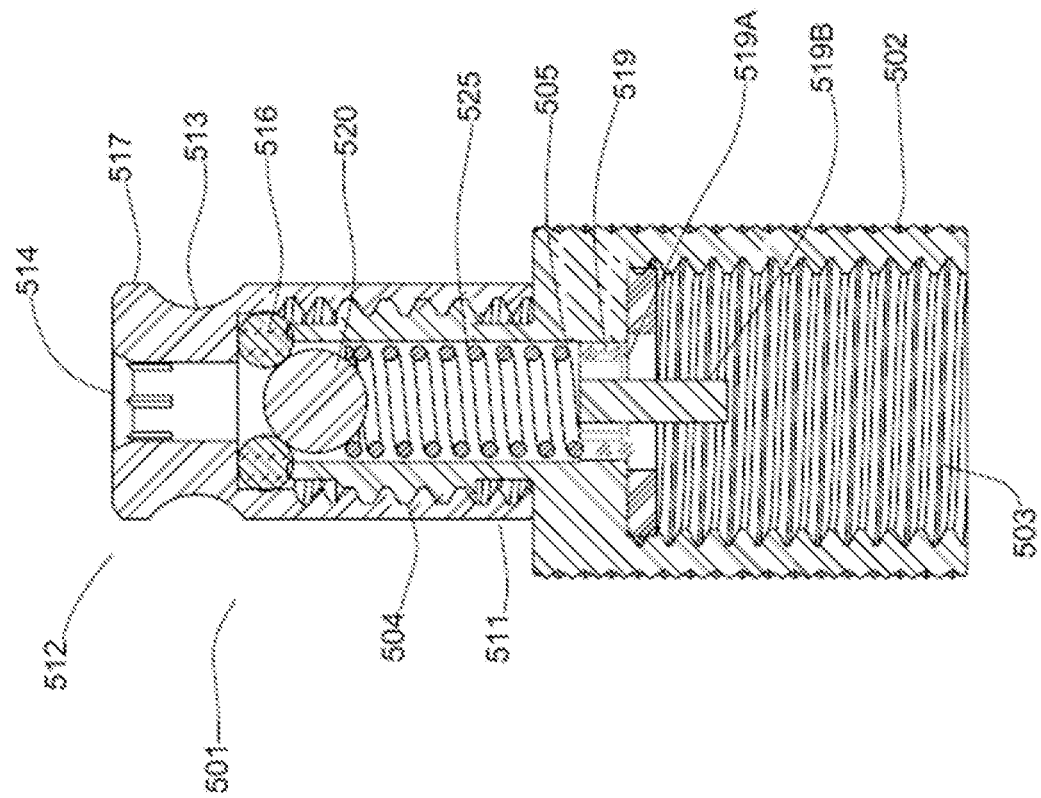
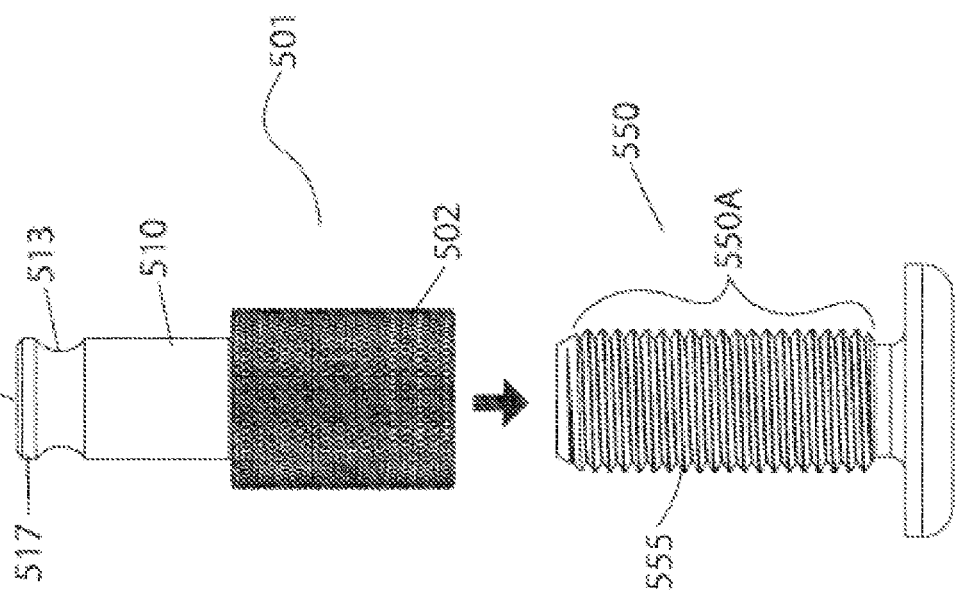
FIG. 14B
FIG. 14A

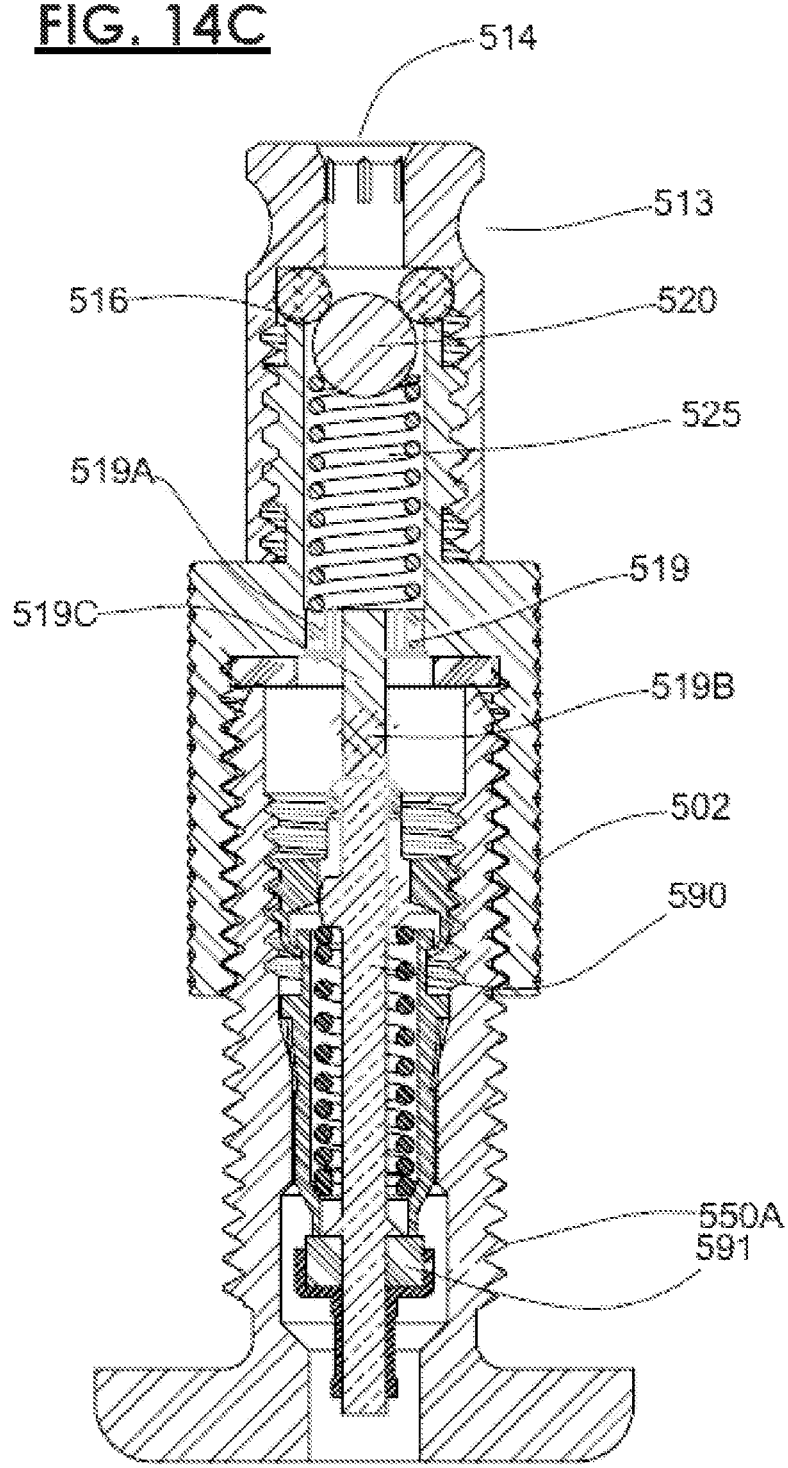

PNEUMATIC VALVE SYSTEM AND METHODS OF USING THE SAME

FIELD OF THE INVENTION

The present invention relates generally to a pneumatic valve system for use with fluid pumps and methods of making and using the same. More particularly, the present invention relates to improved valve systems as an alternative to Schrader, Presta, and Dunlop valves, and other pneumatic valves.

BACKGROUND OF THE INVENTION

Pneumatic valve systems for connecting a pressurized air source (e.g., a pressurized tank or an air pump) to a pneumatic tire, tube, or other structure have been in use for quite some time. Conventional devices heretofore devised and utilized are widely used, and yet continue to have design drawbacks. These devices are awkward to attach and keep attached while filling a tube or tire, and often do not provide a reliable seal on the valve stem of the tire, tube, or other structure, leading to leaks. Further, a poor coupling between conventional pneumatic valves and air pressure gauges may lead to inaccurate pressure readings and improperly inflated tires, which can reduce gas mileage (or slow a bicycle) and cause uneven wear on the tire, reducing the life of the tire and potentially voiding manufacturer warrantees. While conventional devices fulfill their respective, particular objectives and requirements (i.e., increasing air pressure in a tube or tire), they also have functional drawbacks that can be frustrating. For instance, often times the use of a valve coupling requires a person to be awkwardly and uncomfortably positioned for a length of time while filling a tube or tire. In such situations, reliability in the connection of the valve is highly desirable to avoid as much physical discomfort and wasted time as possible.

The Schrader valve has significant connection problems due to the manner in which the pump-head is secured to the valve stem. Because the seal between the pump-head and the valve is made on the outside of the valve stem, the internal surface area shared between the distal end of the valve stem and the pump-head valve cavity is relatively large. As a result, the internal pressure of the tire or other vessel to which the valve is attached exerts significant force upon internal pump-head surface that can result in the pump-head being blown off of the valve without a mechanism to hold it in place. To properly secure the pump-head to the valve, a locking lever is included in the Schrader pump-head design. The grasping mouth piece of the Schrader pump-head exerts significant force to sufficiently compress the rubber in order to keep the pump-head from "popping" off due to the high instantaneous output pressures from the pump in combination with the building of internal pressure in the tire or other vessel. As a consequence, virtually all Schrader valve pump-heads suffer from the same problem—they are difficult and awkward to lock, requiring two hands and considerable finger strength to mate and lock the pump-head.

The Presta valve has several disadvantages, and is notoriously difficult to use. It has the same issues as a Schrader valve, namely, that the pump-head experiences forces sufficient to blow it off the valve stem without a locking mechanism. The locking lever and chuck are difficult and awkward to handle. The Presta valve has additional difficulties and drawbacks, including the additional inconvenience of having to unscrew the captive nut that forms part of the valve stem structure, the requirement of a specialized pump that fits the specialized Presta design, the delicate and damage-prone design of the Presta valve stem, and the common problem of the threaded core of the Presta valve stem unthreading from the stem housing when engaged with a pump-head.

Thus, there continues to be a need for pneumatic valve couplers that improve upon the concepts and designs of conventional devices.

SUMMARY OF THE INVENTION

The present invention provides a novel valve and inflation system for pneumatic tires and related devices to improve ease of use. The invention described herein was designed to serve as an easy-to-use tire valve and valve coupler system, and is presented as an alternative to the longstanding tire valve systems. The new valve system allows the user to apply a valve coupler to a valve stem in one linear motion without the need for applying a clasp or latch to secure the valve coupler to the valve stem. The present invention allows for a smooth axial attachment of the valve coupler to the valve stem, and prevents leaks between the valve coupler and valve stem. Thus, the invention provides significant improvement over the conventional valve system, providing a valve system that is mechanically more reliable, efficient and ergonomic for the user.

The present design uniquely incorporates a miniature ball check valve mechanism in combination with an inflation pin as an actuator, and a ball and groove retaining or locking mechanism for attaching a novel pump-head to the novel valve structure. The present valve system provides for equivalent flow rates, with improved sealing stability and an easier method of actuation that eliminates the need for external threaded connections or levered locking chucks to mate and secure the pump-head to the valve. In contrast to prior valve systems, e.g., Schrader, Presta, and Dunlop valves, which require the user to exert significant downward force with a female pump-head and actuator, and to use the other hand to engage a locking lever on the valve coupler, the present valve design requires only minimal force to engage and secure the female coupler of the pump-head with the valve stem. It is likely that most users will only need one hand, and as little as just two fingers, to complete the mating of the valve of the present invention. With relevance to its application as a cycling valve, this detail is especially significant considering the small space between wheel spokes that is often a source of frustration for recreational and professional cyclists alike. The presently disclosed valve improves in ease-of-use over conventional valves and makes it possible for those with physical limitations of the hand due to injury or disease, or simply due to lack of finger strength or coordination (e.g., as with young children or seniors), to more easily connect the pump-head and consequently use a tire or other inflatable equipment.

Beyond ease-of-use improvements, the present valve system offers considerable versatility, as it may be scaled in size or reconfigured to accommodate a wider range of flow rates, tire pressures, and sizes. As an example, a very small diameter version can be made for use in performance bicycle tires without changing the fundamental mechanism of the present valve system. Additionally, the present invention includes adapter systems that are operable to be implemented with a tire or tire tube that has a Schrader, Presta, or Dunlop tire valve to allow for easy push-on and pull-off functionality, giving users the option to continue using their existing valve system with a valve stem adapter and the female coupler of the present invention adapted to such use.

The presently disclosed valve may be manufactured using various materials, allowing adaptation to different environments and different uses. For applications that require corrosion resistance, such as automotive tires, stainless steel or non-ferrous metals such as brass may be used. In other applications, for example a cycling valve, where economics require a low-cost mass production material, aluminum may be used. Looking beyond metal, the valve may also be suitable for partial or complete fabrication by 3D printing materials, including; ABS, PETG, Nylon, Carbon Fiber, ASA, or Polycarbonate. 3D printed components may be produced to provide an effective low cost valve for use in numerous applications beyond vehicle tires and tubes. For example, a low-cost plastic version of the valve may effectively serve for use inflatable equipment such as inner tubes and air mattresses, and other similar devices. Inclusive in this application of invention are functional designs that are tailored to both materials; metals and carbon/non-carbon plastics. Some applications may call for a combination of several different materials, providing a valve which may comprise metal, plastic, and other materials such as rubber or carbon fiber. In addition, the present design may be applied to higher pressure situations, such as valves for liquid systems, hazardous fluids, and other applications in which a reliable, leak-proof seal is required. Various design implementations are demonstrated to support a broad protection for the novelty of design across numerous applications.

In one aspect, the invention relates to a pneumatic valve system for easily attaching and sealing a pump-head to a valve stem by a novel mechanical connection. In some embodiments, the valve system may comprise (1) a valve stem with the following major components—a valve cap with a pin passage and an attachment mechanism for attaching to a valve coupler of the pump-head, a sealing mechanism having a sealing member, a seat against which the sealing member may be positioned, and a biasing member to bias the sealing mechanism to a sealed position, and a chamber into which the inflation pin passes when the pump-head is engaged with the valve stem; and (2) a pump-head comprising the following—a valve coupler comprising a housing, a pin seat, an inflation pin, a collar with ball bearings complementary to the attachment structure of the valve cap, and a bearing sleeve for providing inward force against the ball bearings (e.g., an elastic sleeve). The valve system may allow for easy, secured and sealed engagement between the valve coupler and valve stem by simply pushing down on the valve coupler on an axial path, and disengagement by pulling up on the valve coupler, without the need for levers, clasps, or other cumbersome devices. The inflation pin may displace the first sealing mechanism from the pin passage and pass into the first chamber as the valve coupler is pushed down over the valve stem, creating a passage of air through the inflation pin into the chamber. The displacement of the sealing mechanism and the insertion of the distal end of the inflation pin into the chamber allows for air from the pump-head to flow from the inflation pin into the chamber. The chamber may be in open fluid communication with the interior of a pressurizable vessel to which the valve stem is connected (e.g., a tube, a tire, a raft, an air mattress, an inflatable chair, an inflatable toy, and the like), allowing the pressurizable vessel to be inflated.

In some embodiments, the valve system may comprise (1) a valve stem with the following major components—a valve cap with a pin passage and an attachment mechanism for attaching to a valve coupler of the pump-head, a first chamber having a first sealing mechanism therein, a biasing member to bias the first sealing mechanism to a sealed position, a second chamber having a second sealing mechanism therein, and a passage between the first chamber and a second; and (2) a pump-head comprising the following—a valve coupler comprising a housing, a pin seat, an inflation pin, a collar with ball bearings complementary to the attachment mechanism of the valve cap, and a bearing sleeve for providing inward force against the ball bearings (e.g., an elastic sleeve). The valve system may allow for easy, secured and sealed engagement between the valve coupler and valve stem by simply pushing down on the valve coupler on an axial path, and disengagement by pulling up on the valve coupler, without the need for levers, clasps, or other cumbersome devices. The inflation pin may displace the first sealing mechanism from the pin passage and pass into the first chamber as the valve coupler is pushed down over the valve stem, creating a passage of air through the inflation pin into the first chamber. The displacement of the first sealing mechanism may result in the actuation and displacement of the second sealing mechanism, thereby opening the passage between the first and second chambers. The air from the pump-head may pass from the inflation pin into the first chamber and then into the second chamber through the passage between the first chamber and the second chamber. The second chamber may be in open fluid communication with the interior of a pressurizable vessel to which the valve stem is connected (e.g., a tube, a tire, a raft, an air mattress, an inflatable chair, an inflatable toy, and the like), allowing the pressurizable vessel to be inflated.

In another aspect, the invention relates to a valve conversion system for converting a conventional pneumatic valve with a novel valve stem and pump-head combination that easily attaches and seals the pump-head to a valve stem by a novel mechanical connection. In some embodiments, the conversion system may comprise (1) a valve stem adapter with the following major components—a valve stem connector operable to attach to a pre-existing conventional valve stem, a cap with a pin passage and an attachment mechanism for attaching to a valve coupler of the pump-head, a sealing mechanism, a biasing member to bias the sealing mechanism to a sealed position, and a chamber into which the inflation pin passes when the pump-head is engaged with the valve stem; and (2) a pump-head comprising the following—a valve coupler comprising a housing, a pin seat, an inflation pin, a collar with ball bearings complementary to the attachment structure of the valve cap, and a bearing sleeve for providing inward force against the ball bearings (e.g., an elastic sleeve). The valve conversion system may allow for converting a conventional valve into an easily secured and sealed engagement between the valve coupler and the valve stem adapter by simply pushing down on the valve coupler on an axial path, and disengagement by pulling up on the valve coupler, without the need for levers, clasps, or other cumbersome devices. The inflation pin may displace the sealing mechanism from the pin passage and pass into the chamber as the valve coupler is push down over the valve stem, creating a passage of air through the inflation pin into the chamber. The displacement of the sealing mechanism and the insertion of the distal end of the inflation pin into the chamber allows for air from the pump-head to flow from the inflation pin into the chamber. In some embodiments, the valve core of the conventional valve (e.g., a Presta, Schrader, or Dunlap valve) may be removed before the valve stem adapter is attached in order to improve the performance of the of valve, leaving the valve housing to which the valve stem adapter is attached. In other embodiments, the valve core of the conventional valve may remain intact, and the valve stem adapter may be attached to the valve housing. In such embodiments, the inflation pin may displace the pre-existing valve actuator of the conventional valve when the pump-head is coupled to the valve stem adapter. In some embodiments, the valve stem adapter may include a structure that displaces the pre-existing valve actuator of the conventional valve and maintains it in an open position, leaving a valve mechanism internal to said valve stem adapter controlling the flow of fluid through the valve stem. The actuation of the valve actuator results in the chamber being in open fluid communication with the interior of a pressurizable vessel to which the conventional valve stem is connected (e.g., a tube, a tire, a raft, an air mattress, an inflatable chair, an inflatable toy, and the like), allowing the pressurizable vessel to be inflated.

In another aspect, the invention relates to an adapter system for use with existing pneumatic valve systems (e.g., Schrader, Presta, and Dunlap valves) that includes a valve stem adapter that is operable to connect to a pre-existing valve stem (e.g., for a Schrader, Presta, or Dunlap valves) and a pump-head that is operable to securely connect to the valve stem by simply pressing the pump-head onto the valve stem in an axial manner without the need to manipulate any moving parts. In some embodiments, the valve system may comprise (1) a valve stem with the following major components a coupling mechanism (e.g., complementary threading) to attach the valve stem adapter to the pre-existing valve stem (e.g., a Schrader, Presta, or Dunlap valve stem), a pin passage for accepting an actuating pin from the pump-head assembly, a sealing member, and a coupling mechanism for engaging the pump-head; and (2) a pump-head comprising the following a valve coupler comprising a housing, a collar with ball bearings complementary to the second coupling mechanism of the valve stem adapter, and a bearing sleeve for providing inward force against the ball bearings (e.g., an elastic sleeve), a pin seat, and an actuator pin. The actuator pin may engage with the valve actuator of the pre-existing valve stem, thereby taking advantage of the existing valve mechanism to inflate the pneumatic device in which the valve is installed. The valve adapter system may allow for easy, secured and sealed engagement with the valve stem adapter by simply axially pressing the pump-head coupler onto the valve stem adapter, and disengagement by pulling up on the pump-head, without the need for levers, clasps, or other cumbersome devices.

In some embodiments, the valve stem adapter may replace internal actuation structure of the pre-existing valve (e.g., a Schrader, Presta, or Dunlap valve actuator) with a valve structure comprising a pin passage, a sealing member, and a biasing member. For example, the valve stem adapter may include an internal valve structure that is seated in the pre-existing valve stem housing after the internal valve mechanism of the pre-existing valve stem has been removed. The valve stem adapter may include a central channel through which air may pass when the valve mechanism is engaged, a sealing member such as a ball bearing, a sealing member seat against which the sealing member may form an airtight seal, and a biasing member for biasing the sealing member against the sealing member seat when a pin of the pump-head is disengaged from the valve stem adapter.

Features of the various embodiments and methods of the present invention are discussed below in further detail.

Valve Stem Base

In some embodiments, the valve stem may be attached to and in fluid communication with a pressurizable vessel, such as a tube, a tire, a raft, an air mattress, an inflatable chair, an inflatable toy, and the like. The valve stem may act as an inlet and outlet for such vessel, and allow for easy and secure connection with the valve coupler, which may be in fluid communication with a pressurized air source (e.g., an air compressor), in order to pressurize the vessel.

The valve stem may include a valve structure and mechanism operable to maintain an airtight seal until a pump-head is attached to the valve by a complementary valve coupler to inject air through the valve stem into the tire or other Tillable vessel. In some embodiments, the valve stem may comprise a tubular shape having a central passage, a base attached to the vessel, and a valve cap structure enclosing the valve mechanism. The valve cap may attach to the base by an attachment structure for semi-permanent connection to the base of the stem. In some embodiments, the attachment structure may comprise a threading on an outer surface of a distal end of the base, the threading having a shape complementary to the shape of a threading of the valve cap. In other embodiments, the attachment structure may comprise a lip and the valve cap may comprise a circumferential concavity in an inner surface thereof, or vice versa, the lip having a shape complementary to the circumferential concavity. The valve stem base may be composed of rigid material (e.g., noncorrodible metal, such as brass, stainless steel, aluminum, etc.) and the cap may comprise the same or similar rigid material (e.g., a metal, carbon fiber, a rigid plastic, and the like). In some embodiments, the valve stem base may comprise a single, rigid (e.g., a metal, carbon fiber, a rigid plastic, and the like) or semi-rigid material (e.g., a polymeric material with limited flex). In some embodiments, the valve cap may be integral with the valve stem and comprise the same material(s).

Valve Cap and Actuation Mechanism

The valve cap may comprise a casing having a proximal end and a distal end. In some embodiments, the proximal end may comprise a substantially cylindrical shape and an inner surface having an attachment structure complementary to the attachment structure of the base, allowing the valve cap to securely attach to the valve base in an air-tight manner. In some embodiments, the attachment structure of the valve cap may comprise a threading having a shape complementary to a shape of a threading on the outer surface of the base of the valve stem.

The second end of the valve cap may comprise an outer surface having a coupling neck for removably attaching to the valve coupler (pump-head), and a valve pin passage substantially coaxial with a central passage of the valve stem. In some embodiments, the coupling neck of the distal end of the valve cap may comprise one or more concavities, such as a circumferential concavity having a shape complementary to the shape of a coupling collar of the valve coupler. In some embodiments, the coupling collar of the valve coupler may comprise at least one ball bearing nested in the coupling collar of the valve coupler and biased inwardly by the elastic sleeve. In some embodiments, the pin passage may comprise a substantially cylindrical passage, the passage being co-axial with the central passage of the valve stem, and traversing the distal end of the valve cap. The pin passage may comprise a diameter to accept the inflation pin of the valve coupler, such that the inflation pin may pass through the pin passage and into the central passage of the valve stem.

The valve cap may include at least one valve mechanism and the valve stem may include at least one sealing member and may be held in a sealed position by at least one biasing member until the pump-head is coupled to the valve stem. The valve mechanism may be positioned between the valve base and the valve cap, and fit entirely within the valve base and/or the valve cap. In some embodiments, the biasing member may comprise a spring having an overall substantially cylindrical shape (e.g., an open coil shape), the spring having an outer diameter complementary to (e.g., substantially similar to, but smaller than) an inner diameter of the valve cap. In some embodiments, the base of the valve stem may comprise a shoulder on an inner surface at or near the bottom of the chamber, the shoulder being operable to provide a seat for a biasing member, the biasing member providing an elastic force for biasing a sealing member toward a sealed position (e.g., against a sealing ring of the valve cap). The at least one sealing mechanism may include a sealing member positioned at the upper end of the biasing member and having a shape that is complementary to the pin passage in the valve stem, such as a spherical shape, an ovular shape, a conical pyramid shape, or other shapes operable to engage with the biasing member and form a seal with a sealing ring in the pin passage of the valve cap. The air pressure behind the sealing member when the tire or other pneumatic vessel is inflated may be sufficient to reliably seat and maintain the sealing member in a sealed position in the pin passage. Thus, the spring may be a light duty spring, and the force of the spring may be easily countered by the downward force of the inflation pin when the pump-head is attached to the valve stem.

In some embodiments, the sealing mechanism may comprise a substantially spherically shaped sealing member (e.g., a ball bearing, or other substantially spherical structure comprising a rigid or semi-rigid material such as polymeric, metal, or ceramic materials, or composites thereof), a sealing rod having a flared tip, or a related structure, and the spring may have an inner diameter smaller than an outer diameter of the sealing member, such that the sealing member is operable to sit on an upper end of the spring. The outer diameter of the sealing member may be smaller than an inner diameter of the valve cap, such that the sealing member may move freely within the valve cap and air may pass around the sealing member when the sealing member is in an open position (e.g., not seated against a sealing ring of the valve cap). In some examples, the sealing member may be fixed to the upper end of the spring. The sealing member may engage and press against an inferior surface of a sealing ring to close the pin passage and prevent the flow of air through the valve. In the case of a spherical or spheroidal ball as the sealing member, the spring or other biasing member may be omitted, as the air pressure behind the ball bearing ensures it is forced into the O-ring, and covers the interior diameter. In such examples, an air permeable mesh material or short spring attached to the lower portion of the chamber may be used as a stand-off for the sealing ball so that it does not choke the air flow through the air passage at the bottom of the chamber during inflation.

The valve cap may comprise a shoulder concentric with the pin passage. The shoulder may provide a seat for a sealing ring. The sealing ring may be held in position between the shoulder of the valve cap and the circular upper tip of the valve base. The sealing ring may be compressed between the shoulder and the tip of the valve base, thereby preventing air from flowing through the threaded area of the valve cap and restricting airflow outside of the inflation pin. The sealing ring may have an outer diameter complementary to an inner diameter of the valve cap, and the sealing ring may have an inner diameter substantially smaller than an outer diameter of the sealing member. The sealing ring may provide a stop against which the sealing member is pressed by the biasing member when the valve stem is not engaged with the valve coupler. When the valve coupler is engaged with the valve cap, the inflation pin may pass through the center passage of the sealing ring. The inner diameter of the sealing ring may be substantially similar to (i.e., the same or slightly less than) an outer diameter of the inflation pin, such that it may deform or stretch slightly to allow passage of the inflation pin and form an airtight seal between the sealing ring and the inflation pin against the air pressure inside the vessel.

The sealing ring may be a compressible structure that seals against the shoulder in the inner passage in the valve cap and has a central opening through which a valve needle can be passed when the valve stem is coupled to a valve coupler. The sealing member is pressed against the sealing ring by the biasing member to create an airtight seal in the valve stem until the valve coupler is engaged with the valve stem to inflate the pressurized vessel. The sealing member (e.g., ball bearing, sealing rod, etc.) may include a spherical, spheroidal, or other tapering shape that has a greater diameter than the inner diameter of the sealing ring and naturally finds the inner diameter of the sealing ring due to its tapering shape. The sealing ring may be an O-ring type gasket with a circular or ovular cross-section that is complementary to the outer surface of the sealing member, allowing the sealing member to have significant surface area interface with the sealing ring, and thereby creating a reliable airtight seal. The sealing ring may be comprised of a semi-rigid, but compressible material such as vulcanized rubber, silicone, fluorosilicone, ethylene-propylene (EPDM), polyurethane, or other appropriate materials.

In the embodiments of the present invention, sealing ring may be configured such that it has an internal diameter just large enough to accept the inflation pin, providing a tight seal around the inflation pin as it is inserted through the pin passage and the sealing ring and into the chamber. The engagement of the inflation pin with the sealing ring provides a narrow path for the travel of pressurized air from the pump-head and through the valve stem. Due to the sealing ring (or other sealing device), the pin passage is only large enough for the inflation pin to pass. This is an improvement over conventional pump-head-valve stem engagements, such as the Schrader valve. In the Schrader valve design, when the pump-head is engaged to the valve, a relatively large ring-shaped passage is formed around the plunger in the valve. The pump-head pushes the plunger into a recessed position in the Schrader valve allowing a ring-shaped column of air to pass through the valve. This creates a considerable amount of blowback pressure on the pump-head of the Schrader valve. This is the reason why a Schrader valve includes the clumsy thumb lever that needs to be locked into position prior to pumping with the Schrader system. The narrow, controlled air passage of the valves of the present invention reduces the pressures experienced by the pump-head, allowing for a less rigid and clumsy coupling mechanism that is easy to use. The pump-head of the present invention can be simply pushed down over the valve stem to the point that the ball bearings find and seat in the attachment mechanism (e.g., a channel or collar) on the outer diameter of the valve stem, with an elastic bearing sleeve applying inward pressure on the bearings to seat and hold them in the attachment mechanism. The pump-head can be removed just as easily by pulling it axially away from the valve stem. Thus, the present invention is operable to provide a pump-head with an easily attached and removed elastic quick connect mechanism. However, it is to be understood that the present invention includes embodiments in which the quick connect collar may be a sliding ridged collar that must be moved from a seated position by sliding the collar into an open position in order to release pressure on the ball bearings and allow them to be either seated or unseated from the attachment mechanism of the valve collar.

In some embodiments, the valve system may include two independent sealing mechanisms that eliminates the pressure loss that occurs in conventional valve designs when the pump-head is decoupled from the valve stem, which can be significant (e.g., up to 10 PSI). In such embodiments, the valve stem may include two serial chambers, each sealed off by a separate sealing mechanism. The upper chamber may include a first sealing ring against which a first sealing member is pressed when in a closed position, and the lower chamber may include a second sealing ring or a sealing seat. In some embodiments, the first sealing member may be a sealing rod having a tapering plug at its upper end that engages with the first sealing ring when in a closed position. A biasing member (e.g., a spring) may be positioned in the upper chamber and engaged with the sealing rod and may bias the sealing rod toward the first sealing member. In the case of a spring biasing member, the sealing rod may be engaged with the spring by having a portion nested within the spring, or it may be attached to the upper end of the spring. The bottom end of the spring may be seated on a shoulder of the first chamber. In some embodiments, a filter structure may be included in the upper chamber that is operable to catch particulate matter and prevent the introduction of particulates into the valve stem or the inflatable vessel to which it is attached. Particulate matter can obstruct valve mechanisms and result in valve leakage and even valve failure. The particulate filter may have a ring structure that is positioned around the shaft of the sealing rod between the plug and the spring such that it is maintained in a position adjacent to the plug. The particulate filter may be a metal mesh material or a perforated metal disk (e.g., laser-perforated stainless steel, aluminum, or other rigid material). In other embodiments, the structure of the first chamber and sealing mechanism therein may have a similar design to the chamber and sealing mechanism in the embodiments described above.

The second chamber may include a second sealing mechanism that includes a sealing member that seats against a complementary seat that provides a relatively large surface area interface between the sealing member and the complementary seat. The sealing member may be a substantially spherical rigid ball (e.g., stainless steel, aluminum, or other non-corrodible material). The complementary seat may have a spherical cap shape comprised of flexible thermoplastic, Buna-N Nitrile, gum rubber, Hypalon™, Neoprene™, polyurethane, SBR (red rubber), silicone, Viton™, fluorosilicone, ethylene propylene, butyl, or other materials. The material can be somewhat flexible such that it flexes when the sealing member pushes against the seat by the internal pressure of the pressurized vessel. In other embodiments, the seat may be a tri-point ball seat, which is highly effective in combination with a spherical sealing ball to provide an airtight seal, even at relatively low pressures in the vessel to which the valve stem is attached. The tri-point seat is composed of portions of two spherical caps of different diameters that may be joined together to create a figure 8-like structure. One of the spherical caps may have a cross-sectional area that is 10-15% larger than that of the sealing ball and the other spherical cap may have a cross-sectional that is 10-15% smaller than that of the sealing ball. The two spherical cap portions may be formed or joined together by being integrally molded, fused together by welding or lapping techniques, or other appropriate method. A seat with this geometry results in a perfectly circular land between the two spherical cap structures with no concentricity errors or squareness errors, and allows for a very tight seal with near zero leakage, even under low pressures. The seat may be made from high tensile strength, high hardness metal.

In such embodiments, the second sealing member in the second chamber may be held in place in the seat by the pneumatic pressure in the vessel. When the pump-head is engaged with the valve stem, the inflation needle passes through the first sealing ring and engages with the plug of the sealing rod in the first chamber and displaces the sealing rod from the first sealing ring. The lower end of the sealing rod opposite the plug subsequently engages with the second sealing member in the second chamber and displaces the second sealing member from the seat opening the second seal of the valve stem. The length of the sealing rod may provide a small gap between the distal end of the sealing rod and the second sealing member. The small gap (e.g., in a range of about 1 mm to about 5 mm) may allow the second sealing member to seal before the first sealing member as the pump-head is removed from the valve stem, thereby assisting the in the prevention of leakage during disengagement of the pump-head.

Air or other gas may then flow through inflation needle into the first chamber and then through the passage between the first and second chambers and through the second chamber to inflate the vessel. The second chamber may include a washer that prevents the sealing ball from passing through the lower passage of the second chamber during inflation. The "stand-off" washer may be a cage-like structure or may have leaf-like projections that allow the passage of air or other inflation gas passed the washer when the sealing ball is in contact with the washer.

Pin Seat

The pin seat may hold the inflation pin in attachment to the valve coupler. The pin seat may be attached to a recess in the valve coupler by a connection mechanism that attaches to a coupler housing, a pin receiver, and a connecting passage. In some embodiments, the distal end may comprise a head (e.g., a disc shape) having an outer diameter greater than an outer diameter of the proximal end. In some embodiments, the head may comprise a groove, protrusion, or other graspable structure (installation structure). The installation structure may have a shape complementary to the shape of the functional portion of a tool used for installing the pin seat in the coupler housing. In some embodiments, the installation structure may have a shape complementary to at least one of a screw driver, a wrench (e.g., a fixed head wrench, a socket wrench, an Allen or hex wrench, and the like), a drill bit, and the like. In some embodiments, the installation structure may be a slot may traverse the upper surface of the distal end (e.g., the head) of the pin seat, crossing through a center-point thereof, and may be positioned such that a longitudinal axis of the slot is parallel with a central axis of the connecting passage of the pin seat (which is not otherwise visible when the pin seat is threaded into the coupler housing). Thus, a user may be able to determine the position (e.g., rotational or radial position) of the connecting passage by observing the position of the slot on the head of the pin seat. The user may further be able to determine the position of the air inlet passage of the coupler housing by observing the position of the air source attachment member, and align the connecting passage with the air inlet passage by aligning the slot with the air source attachment member. Fluid communication may thus be achieved from the air source, through the air source attachment member and the air passage of the coupler housing, through the connecting passage of the pin seat, and into the central passage of the inflation pin (and subsequently into the valve stem when the valve coupler is engaged with the valve stem).

In some embodiments, the proximal end of the pin seat (i.e., the end closest to the valve stem when the valve coupler is engaged therewith) may comprise a pin receiver, the pin receiver comprising a passage substantially co-axial with the central passage of the valve coupler and with the central passage of the valve stem. The pin receiver may be operable to receive a first end of the inflation pin. The pin receiver may have an inner diameter complementary to an outer diameter of the inflation pin such that the inflation pin may be held in a substantially static manner when the first end thereof is engaged with (e.g., inserted into) the pin receiver. The pin receiver may by in fluid communication with the connecting passage of the pin seat.

In some embodiments, the connecting passage of the pin seat may be positioned at approximately a midpoint between the first end and second end of the pin seat, and may be oriented to align with the air inlet passage when the pin seat is attached to (e.g., fully threaded into) the coupler housing. In some embodiments, the connecting passage may comprise a plurality of passages, each in fluid communication with a center point and each comprising an opening on a circumference of the pin seat, the opening being operable to be in fluid communication with the air inlet passage if aligned therewith. In some embodiments, the plurality of passages may comprise two passages, each traversing the pin seat and arranged orthogonal to each other, crossing at a center point. The two passages may thus form an X shape, with the center of the X being arranged at a center point (e.g., at a point on a central axis of the pin seat), the center point being in fluid communication with the central passage of the inflation pin. The end of each arm of the X shape may define an opening in the outer surface of the pin seat. The connecting passage may therefore be operable to put the air inlet passage of the coupler housing into fluid communication with the central passage of the inflation pin when the pin seat is at four different rotational positions (i.e., when any of the arms of the X shape is aligned with the air inlet passage).

When the attachment structure of the pin seat and coupler housing comprise complementary threadings, such an arrangement of the plurality of connecting passages may allow for the pin seat to be within 90 degrees of being fully threaded (e.g., fully tightened) into the coupler housing while providing fluid communication between the inflation pin and the air inlet passage. In some embodiments, the plurality of connecting passages may provide more than four openings arranged circumferentially evenly about the outer surface of the pin seat. In some embodiments, the plurality of connecting passages may provide 6 openings or 8 openings, such that the pin seat may be within 60 degrees or 45 degrees, respectively, of being fully tightened while still providing fluid communication between the air inlet passage and the inflation pin.

Inflation Pin

The inflation pin may comprise a conduit having any shape operable to provide airtight fluid communication between the pin seat and the valve stem. In some embodiments, the inflation pin may comprise a substantially cylindrical shape defining a central passage, the central passage having an inlet at a first end of the inflation pin, and an outlet at or near a second end of the inflation pin. In some embodiments, the first end may be operable to be inserted into the pin receiver of the pin seat and may be in fluid communication with the connecting passage of the pin seat.

In some embodiments, when engaging the valve coupler with the valve stem, the second end of the inflation pin may be operable to be inserted into and to pass through the pin passage of the valve cap, and may thereby pass into the central passage of the valve stem. In some embodiments, the outlet may be arranged on a lateral outer surface of the second end of the inflation pin, rather than on a leading surface of the second end. As such, the leading surface may be free to contact and push the sealing member of the valve stem away from the sealing ring of the valve stem as the inflation pin passes through the sealing ring, without blocking an air flow out of the outlet of the inflation pin.

Valve Coupler

The coupler housing of the valve coupler may comprise an air source attachment member, attachment structure for the pin seat, and a collar for attaching to the valve stem. In some embodiments, the coupler housing may comprise a rigid material (i.e., a metal, a metal alloy, a plastic, a carbon fiber, and the like) and a generally cylindrical shape having a central passage which is substantially co-axial with the central passage of the valve stem when the valve coupler is engaged with the valve stem. The central passage of the coupler housing may have an inner surface having an attachment structure for securing the pin seat in place in the central passage. In some embodiments, the attachment structure of the coupler housing may comprise a threading having shape complementary to a threading on an outer surface of the pin seat, such that the pin seat may securely attach to the coupler housing by threading into the central passage of the coupler housing.

In some embodiments, the coupler housing may comprise at least one sealing ring positioned to create an airtight seal between the pin seat and the coupler housing. In some embodiments, the coupler housing may comprise a first sealing ring and a second sealing ring. The first sealing ring being positioned to create an airtight seal between the pin seat, the coupler housing, and the inflation pin at a proximal end of the pin seat (i.e., opposite the head of the pin seat). The first sealing ring of the coupler housing may have an inner diameter substantially similar to (i.e., the same or slightly less than) an outer diameter of the inflation pin. Thus, when the inflation pin is engaged with the pin seat (i.e., inserted into a pin receiver of the pin seat), the inflation pin may pass through the center passage of the first sealing ring (which may deform or stretch slightly to allow passage of the inflation pin), forming an airtight seal between the first sealing ring and the inflation pin. In some embodiments, the first sealing ring may comprise an outer diameter substantially similar to an inner diameter of the coupler housing, and may be secured in place between the proximal end of the pin seat and a first shoulder of the coupler housing when the pin seat is threaded into the coupler housing. The second sealing ring may be positioned to create an airtight seal between the pin seat and the coupler housing at distal end of the pin seat (i.e., at a head of the pin seat), and may be secured in place between a second shoulder of the coupler housing and a head of the pin seat when the pin seat is threaded into the coupler housing.

The central passage of the coupler housing may be in communication with an air inlet passage of the coupler housing. In some embodiments, a portion of the air inlet passage may be defined by an inner surface of the air source attachment member. In some embodiments, the air inlet passage may be orthogonal in relation to a central axis of the central passage of the coupler housing. In some embodiments, when the pin seat is installed in (e.g., threaded into) the coupler housing, the air inlet passage of the coupler housing may be in fluid communication with a central passage of the inflation pin by way of a connecting passage of the pin seat, and provide the only fluid communication between the central passage of the coupler housing and the inlet passage.

The air source attachment member may comprise any shape or mechanism operable to securely attach to an air source (e.g., a pneumatic hose). The air source attachment member may comprise a central passage in fluid communication with the air inlet passage. In some embodiments, the air source attachment member may comprise a standard male connector for a pneumatic system, the air source attachment member being operable to securely attach to a standard female connector (e.g., a quick connector having a rigid sleeve which may be pulled back from a set of ball bearings in order to attach to the male connector). In other embodiments, the air source attachment member may comprise an outer circumferential lip or circumferential barb, and may be operable to be inserted into a central passage of a pneumatic hose. In some embodiments, the pneumatic hose may comprise a central passage defined by an inner surface, the inner surface comprising a circumferential concavity complementary in shape to the lip or barb of the air source attachment member. In other embodiments, the central passage of the pneumatic hose may be substantially elastic and operable to create an airtight connection with the air source attachment member without having a complementary circumferential concavity on an inner surface thereof.

The valve coupler may comprise an attachment member for securely attaching to the valve cap. In some embodiments, the attachment member may comprise at least one ball bearing nested in a bearing passage traversing a wall of a collar of the valve coupler housing, the at least one ball bearing being inwardly biased by the elastic bearing sleeve encompassing the collar. The bearing passage in the wall of the collar may comprise an outer end which defines an opening in an outer surface of the collar of the valve coupler, and an inner end which defines an opening in an inner surface of the collar. The bearing passage may comprise a substantially cylindrical shape except that the inner end is narrowed in comparison to the rest of the bearing passage (i.e., the inner end has a smaller diameter than the rest of the bearing passage). The ball bearing may have an outer diameter substantially greater than a diameter of the inner end of the bearing passage, and substantially greater than the thickness of the wall of the collar, such that the ball bearing cannot pass completely through the narrowed inner end, but a portion of the ball bearing may protrude through the narrowed end. Because the ball bearing is wider than the wall of the collar, the elastic sleeve encompassing the collar will contact the portion of the ball bearing protruding from the outer end of the passage, and elastically bias the ball bearing toward the inner end. The ball bearing may thus extend into the circumferential concavity of the second end of the valve cap when the valve coupler is engaged with the valve stem, securing the valve coupler in place on the valve stem.

Coupler Sleeve

The coupler sleeve may be arranged around the collar of the coupler housing. In some embodiments, the coupler sleeve may comprise a substantially cylindrical shape having an inner diameter complementary to (e.g., substantially similar to) an outer diameter of the collar. In some embodiments, the coupler sleeve may be comprised of an elastomeric material operable to provide an elastic inward force against the ball bearings of the coupler housing. In some embodiments, when the valve coupler is engaged with the valve stem, the inward force exerted on the ball bearings by the elastomeric coupler sleeve is sufficient to withstand an outward pressure which is exerted on the ball bearings from the attachment structure of the valve cap as the air being passed into the vessel, and thus the valve coupler does not pop off of the valve stem due only to the outward pressure created by filling the vessel with air. At the same time, the elastomeric coupler sleeve may be designed to provide an inward force on the ball bearings which may be easily overcome by pulling the valve coupler away from the valve stem with one hand. In some embodiments, the inward force of the elastomeric coupler sleeve may be overcome by pulling the valve coupler away from the valve stem with the thumb and index or other finger. The elastomeric coupler sleeve may comprise any elastic material operable to provide an inward force against the attachment device of the coupler housing collar. In some embodiments, the elastic sleeve may comprise at least one of polytetrafluoroethylene (PTFE), natural rubber, synthetic rubber, nitrile rubber, silicone rubber, urethane rubbers, chloroprene rubber, and Ethylene Vinyl Acetate.

Thus, the valve coupler may be engaged with the valve stem by simply aligning the collar of the valve coupler with the valve cap of the valve stem, and applying force against the valve coupler with one hand. This action may cause the collar to slide down over and engage with the valve cap. The force applied against the valve coupler must be sufficient to: 1) cause the ball bearing(s) of the collar to move outwardly against the inward force of the elastic sleeve in order to slide over an upper lip of the valve cap before moving back inwardly into the attachment member of the valve cap (e.g., the circumferential concavity), and 2) cause the inflation pin to insert through the center of the sealing ring and disengage the sealing member from the sealing ring against the bias of the biasing member, such that the outlet of the inflation pin moves past the sealing ring and into the fluid communication with the central passage of the valve stem. As discussed above, the sealing ring may have an inner diameter that is equal to or slighting narrower than the outer diameter of the inflation pin, such that an airtight seal is made between the inflation pin and the sealing ring. The airtight engagement of the sealing ring and inflation pin results in the restriction of the flow of air between the pump-head and the valve stem to passage through the inflation pin. This reduces the force applied to the pump-head by the pressurized air in the pneumatic vessel to a negligible amount, thereby allowing the pump-head to be attached using the elastomeric coupler sleeve connection mechanism without the need for cumbersome locking mechanisms like that of the Schrader valve design.

In some embodiments, the coupler sleeve may have a rigid, sliding sleeve that holds the ball bearings seated in the receiver in the valve stem cap. The sliding sleeve may have a first inner diameter sufficient to pass along the collar of the coupler housing and hold the ball bearings seated in the receiver in the valve stem cap. The sliding sleeve may have a second inner diameter that is sufficiently large to allow the ball bearings to release from the receiver in the valve stem cap and to allow the pump-head to be pulled off of the valve stem. The sliding sleeve may be biasing toward a closed position in which the first inner diameter is positioned over the ball bearings in order to lock the ball bearings into position in the receiver in the valve stem cap. In order to release the pump-head, the sliding sleeve can be pulled upward toward the pump-head in order to align the second inner diameter with the ball bearings and allow them to unseat from the receiver in the valve stem cap. The pump-head can then be removed by pulling the pump-head axially up and off of the valve stem. Embodiments that include the sliding sleeve also provide an easily operated engagement mechanism that can be attached and removed using one hand. The user can pull the sliding sleeve back into a retracted position, place the coupler sleeve over the valve stem such that the ball bearings are aligned with the receiver in the valve stem, and then release the sliding sleeve to allow the biased sleeve to move downward towards the valve stem to position the first inner diameter over the ball bearings to seat them in the receiver and lock the pump-head onto the valve stem. To release the pump-head, the use may simply grab the sliding sleeve and pull upward away from the valve stem, which moves the second inner diameter into position over the ball bearings, releasing the ball bearings and pulling the pump-head off of the valve stem in one motion. The sliding sleeve may be utilized in higher pressure situations in which the fluid pressures acting on the valve system are higher or in situations where the valve system is employed to transfer liquid, hazardous gases, or other high pressure or hazardous fluids.

Method of Use

A method for using the valve system of the present invention may comprise the steps of: 1) providing a valve coupler having an inflation pin and a collar having at least one ball bearing inwardly biased by an elastic sleeve for attaching to a valve stem; 2) providing a vessel having a valve stem, the valve stem having a sealing member biased against a sealing ring and a valve cap having a pin passage for accepting the inflation pin and a concavity for seating the at least one ball bearing of the collar; 3) engaging the valve coupler with the valve stem such that the inflation pin passed through the pin passage and the sealing ring; 4) passing a sufficient volume of air through inflation pin into the valve base to inflate a pressurizable vessel; and 5) disengaging the valve coupler from the valve stem. In some embodiments, the step of engaging the valve coupler with the valve stem may be performed by aligning the collar with the valve cap and applying a linear, axial force to the coupler. In some embodiments, the force applied to the coupler must be in the direction of the valve stem and must be sufficient to move the at least one ball bearing past a lip of the valve cap and into the circular depression of the valve cap. In some embodiments, the force applied to the coupler must be sufficient to cause the inflation pin to insert through the sealing ring and disengage the sealing member from the sealing ring against the bias of the biasing member. In some embodiments, the force applied to the coupler may be applied with one hand. In some embodiments, the step of disengaging the coupler from the valve stem may be accomplished with two fingers.

A method for using the valve system of the present invention may comprise the steps of: 1) providing a valve coupler having an inflation pin and a collar having at least one ball bearing inwardly biased by an elastic sleeve for attaching to a valve stem; 2) providing a vessel having a valve stem, the valve stem having a first sealing member biased against a first seat creating a first seal and a second sealing member and a second seat creating a second seal, and a valve cap having a pin passage for accepting the inflation pin and a concavity for seating the at least one ball bearing of the collar; 3) engaging the valve coupler with the valve stem such that the inflation pin passed through the pin passage and a central passage in said first seat to displace said first sealing member opening the first seal, which in turn displaces the second sealing member from the second seat opening the second seal; 4) passing a sufficient volume of air through inflation pin into the valve base to inflate a pressurizable vessel; and 5) disengaging the valve coupler from the valve stem. In some embodiments, the step of engaging the valve coupler with the valve stem may be performed by aligning the collar with the valve cap and applying a linear, axial force to the coupler. In some embodiments, the force applied to the coupler must be in the direction of the valve stem and must be sufficient to move the at least one ball bearing past a lip of the valve cap and into the circular depression of the valve cap.

In methods for using the valve conversion system of the present invention may comprise the steps of: 1) coupling a valve stem adapter to the pre-existing valve stem attached to an inflatable vessel, for example, by threading the valve stem coupler to the exterior threading of the pre-existing valve stem; 2) providing a valve coupler having an inflation pin and a collar having at least one ball bearing inwardly biased by an elastic sleeve for attaching to the valve stem adapter, which includes a pin passage for accepting the inflation pin and a circular depression for seating the at least one ball bearing of the collar; 3) engaging the valve coupler with the valve stem adapter such that the inflation pin passed through the pin passage and the sealing ring and depresses the valve actuator of the pre-existing valve stem; 4) passing a sufficient volume of air through inflation pin through the pre-existing valve stem to inflate a pressurizable vessel; and 5) disengaging the valve coupler from the valve stem.

In some embodiments, at least one of the elastic or semi-rigid elements of the present invention—which may be subject to wear—may be easily replaced by disengaging (e.g., unthreading) at least one of the pin seat from the coupler housing, or the valve cap from the valve stem. In some embodiments, a user may easily replace the sealing ring(s) of the coupler housing by unthreading the pin seat from the coupler housing. In some embodiments, a user may easily replace at least one of the sealing member, the biasing member, and the sealing ring in the valve stem by unthreading the valve cap from the valve stem. In some embodiments, a user may easily replace the elastic sleeve while the valve coupler is not engaged with the valve stem. The pin seat and inflation pin can also be replaced by simple removal and replacement with replacement parts.

Further aspects and embodiments will be apparent to those having skill in the art from the description and disclosure provided herein.

It is an object of the present invention to provide a valve system which is easy to engage and disengage from a vessel which needs to be filled with air.

It is a further object of the present invention to provide a valve system which improves upon conventional valve systems in that it may be fully engage with or disengaged from a vessel to be filled with air by simply pushing or pulling, respectively, on the valve coupler.

It is a further object of the present invention to provide a valve adapter which may be connected to a pre-existing valve stem and improve performance, reliability and ease-of-use of the pre-existing valve stem.

It is a further object of the present invention to provide an improved valve system which creates a more reliable seal while filling a vessel with air without the need for a locking lever or a threaded connection between a valve coupler and valve stem.

It is a further object of the present invention to provide an improved valve system which allows for a more accurate pressure reading in a vessel being filled with air, preventing over-filling or under-filling of the vessel and the uneven wear caused thereby.

It is a further object of the present invention to provide an improved valve system which allows for a user to engage and disengage the valve system using one hand, and in some instances as little as two fingers.

It is a further object of the present invention to provide an improved valve system which reduces the time required to fill a vessel to an appropriate pressure.

It is a further object of the present invention to provide an improved valve system wherein all parts which may wear down, e.g., the elastic and/or semi-rigid parts of the valve system, are easily replaceable.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 1A provides a cross-section side view of an improved pneumatic valve system, according to an embodiment of the present invention.

FIG. 3A provides a cross-sectional side view of a pin seat of an improved pneumatic valve system, according to an embodiment of the present invention.

FIG. 3B provides a perspective view of a pin seat of an improved pneumatic valve system, according to an embodiment of the present invention.

FIG. 5A provides a cross-sectional side view of a valve coupler housing of an improved pneumatic valve system, according to an embodiment of the present invention.

FIG. 5B provides a perspective view of a valve coupler housing of an improved pneumatic valve system, according to an embodiment of the present invention.

FIG. 8 provides a cross-sectional view of an improved pneumatic valve system, according to an embodiment of the present invention.

FIG. 9 provides an exploded view of a pneumatic valve adapter system, according to an embodiment of the present invention.

FIG. 14A provides an elevation view of a pneumatic valve adapter system, according to an embodiment of the present invention.

FIG. 14B provides a cross-sectional view of a pneumatic valve adapter system, according to an embodiment of the present invention.

FIG. 14C provides a cross-sectional view of a pneumatic valve adapter system, according to an embodiment of the present invention.

DETAILED DESCRIPTION

Figure 1B:
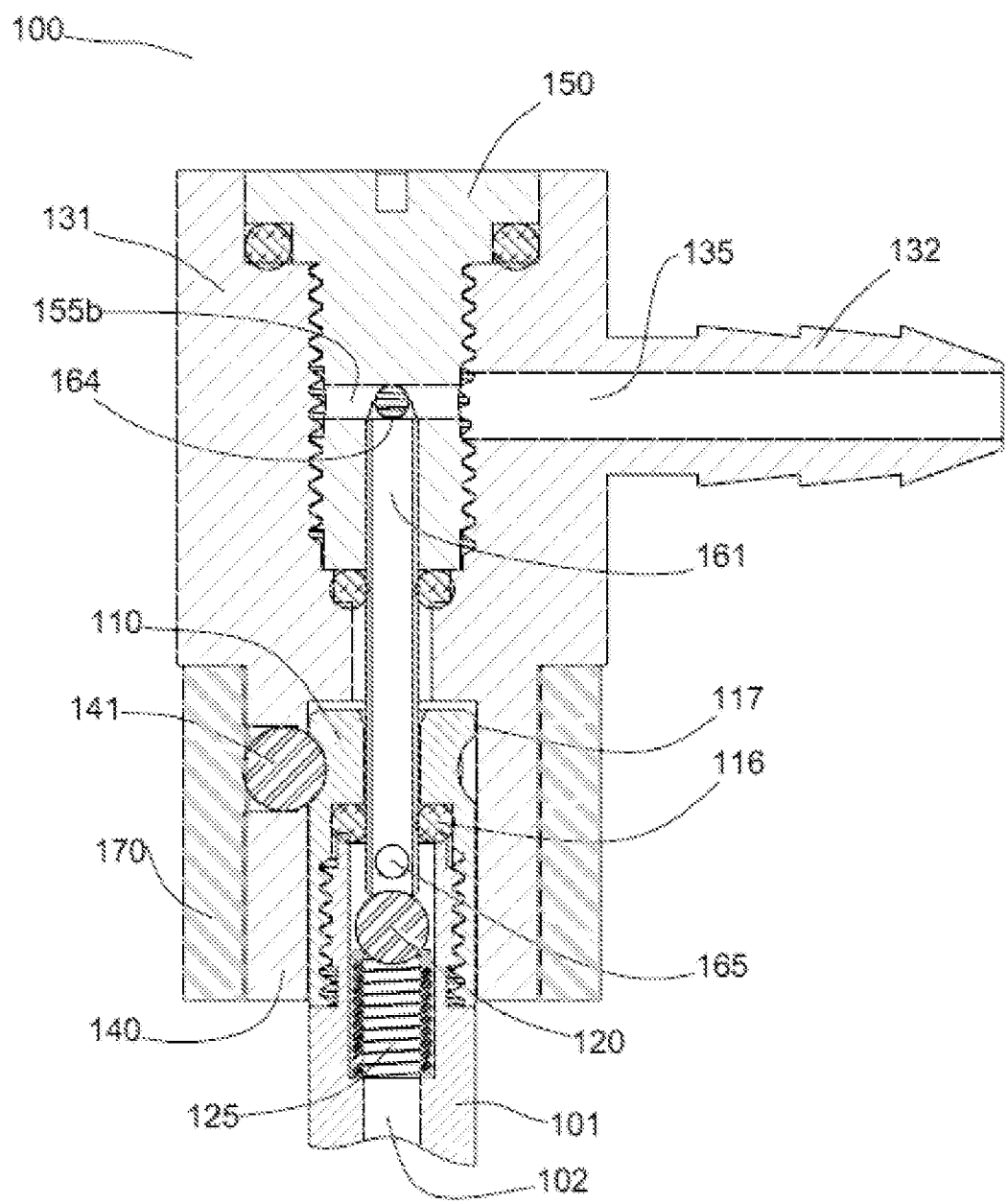
FIG. 1B provides a cross-sectional side view of an improved pneumatic valve system, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns a pneumatic valve system for easily attaching and sealing a valve coupler to a valve stem. As seen in FIGS. 1A-5B, the valve system 100 may comprise the following major components: a valve stem 101, a valve cap 110, a sealing member 120 biased by a biasing member 125, and a valve coupler 130 comprising a coupler housing 131, a pin seat 150, an inflation pin 160, and an elastic sleeve 170.

The valve stem 101 may be attached to and in fluid communication with a pressurizable vessel (e.g., a bicycle tire tube). The valve stem 101 may act as an inlet and outlet for the vessel, and allow for easy and secure connection with the valve coupler 130, which may be in fluid communication with a pressurized air source (e.g., an air compressor, not shown), in order to pressurize the vessel 199. The valve stem 101 may comprise an airtight passage between the pressurizable vessel 199 and the valve cap 110. The valve stem 101 may comprise a tubular shape having a central passage 102, a first end 103 and a second end 104, the first end 103 comprising a base attached to the vessel 199, and the second end 104 may comprise an open end having a threading 105 with a shape complementary to the shape of a threading 115 of the valve cap 110.

The second end 104 of the valve stem 101 may comprise a shoulder 106 on an inner surface thereof, the shoulder 106 being operable to provide a seat for supporting the biasing member 125 (e.g., a spring), the biasing member 125 providing an elastic force for biasing the sealing member 120 toward a sealed position (e.g., against a sealing ring 116 of the valve cap 110). The biasing member 125 may comprise a substantially cylindrical shape (e.g., an open coil shape) having an outer diameter complementary to an inner diameter of the second end 104 of the valve stem 101. The sealing member 120 may comprise a substantially spherical shape and the biasing member 125 may have an inner diameter smaller than an outer diameter of the sealing member 120, such that the sealing member 120 is operable to sit on or partly nest in a distal end 126 of the biasing member 125. The outer diameter of the sealing member 120 may be substantially smaller than an inner diameter of the central passage 102 of the valve stem 101, such that the sealing member 120 may move freely within the central passage 102 and air may pass around the sealing member 120 when the sealing member 120 is in an open position (e.g., not seated against the sealing ring 116 of the valve cap 110, see FIG. 1B).

The valve cap 110 may comprise a proximal end 111 and a distal end 112. The proximal end 111 may comprise a substantially cylindrical shape and an inner surface having a threading 115 complementary to the threading 105 of the second end 104 of the valve stem 101, allowing the proximal end 111 of the valve cap 110 to securely attach to the distal end 104 of the valve stem 101 in an air-tight manner. The distal end 112 of the valve cap 110 may comprise an outer surface having a rounded circumferential concavity 113 for removably attaching to the valve coupler 130, and a pin passage 114 substantially coaxial with the central passage 102 of the valve stem 101. The pin passage 114 may comprise a diameter complementary to a diameter of the inflation pin 160, such that the inflation pin 160 may pass through the pin passage 114 and into the central passage 102 of the valve stem 101.

The sealing ring 116 of the valve cap 110 may have a circular shape and a substantially circular or ovoid cross-sectional shape, and may comprise an elastomeric material. The sealing ring 116 may have an outer diameter complementary to an inner diameter of the valve cap 110, and the sealing ring 116 may have an inner diameter substantially smaller than an outer diameter of the sealing member 120, such that the sealing ring 116 may provide a stop against which the sealing member 120 is biased by the biasing member 125. When the valve stem 104 is not engaged with the valve coupler 130, contact between the sealing member 120 and sealing ring 116 forms an airtight seal against the air pressure in the vessel 119. An inner diameter of the sealing ring 116 may be less than or equal to an outer diameter of the inflation pin 160, such that inflation pin 160 may pass through the sealing ring 116 (which may deform or stretch slightly to allow passage of the inflation pin 160), forming an airtight seal between the inflation pin 160 and the sealing ring 116 against the air pressure inside the vessel 199.

Figure 2A:
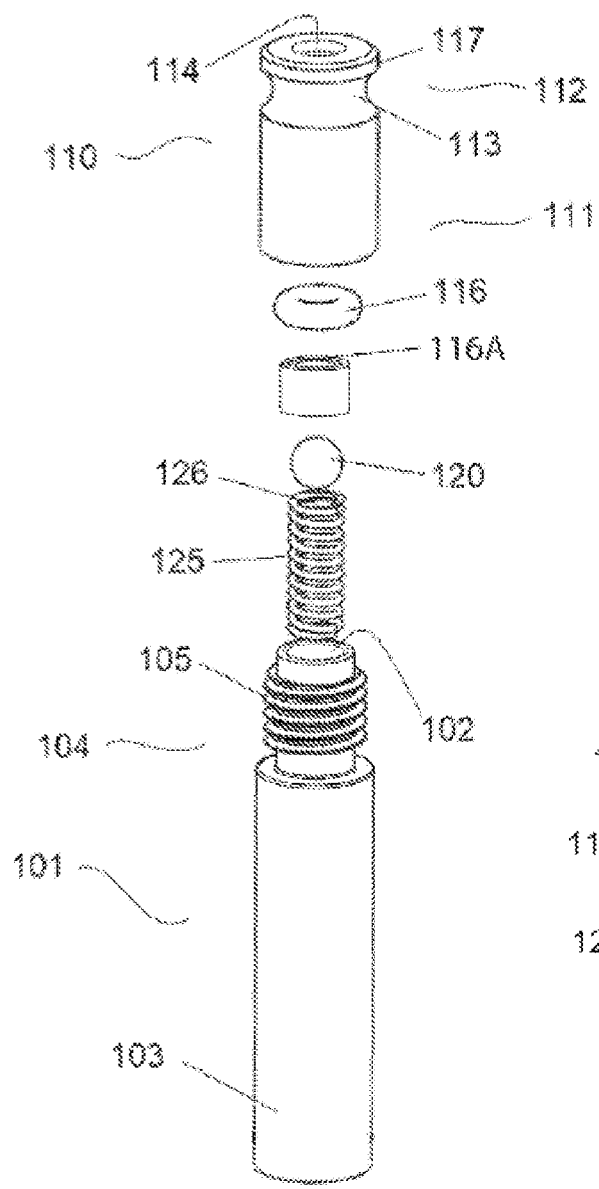
FIG. 2A provides an exploded perspective view of a valve stem of an improved pneumatic valve system, according to an embodiment of the present invention.
Figure 2B:
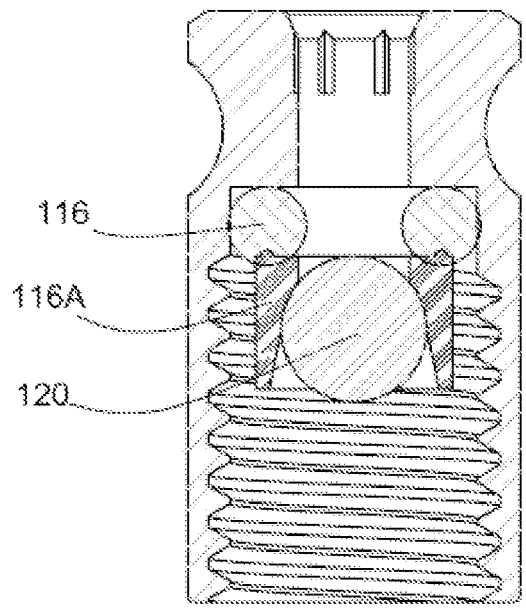
FIG. 2B provides a cross-sectional view of a valve cap of an improved pneumatic valve system, according to an embodiment of the present invention.

In other embodiments, the sealing member 120 may engage with a tri-point ball seat 116a to seal the valve cap 110. The tri-point seat 116a is composed of fused or integrally molded portions of two spherical caps, one having a cross-sectional area that is 10-15% larger than that of the sealing member 120 and the other spherical cap may have a cross-sectional that is 10-15% smaller than that of the sealing ball 221. The spherical caps may be axially aligned, with the smaller of the two caps position over the larger, with a passage in the smaller spherical cap to allow the passage of fluid through the valve cap. The tri-point seat may positioned in the valve cap 110 adjacent and just below the sealing ring 116 and may be supported at its inferior end by the internal shoulder created by the upper rim of threading 105, as shown in FIGS. 2A-2B. The tri-point seat 116a may be made from high tensile strength, high hardness metal.

As best seen in FIGS. 3A and 3B, the pin seat 150 may comprise a proximal end 151 and a distal end 152, a threading 153 for attaching to the coupler housing 130, a pin receiver 154, and a connecting passage 155. The distal end 152 may comprise a substantially disc-shaped head having an outer diameter greater than an outer diameter of the proximal end 151, and a slot 156 having a substantially square cross section. The slot 156 may traverse the upper surface of the distal end 152 and may be positioned such that a longitudinal axis of the slot 152 is aligned in parallel with a first branch 155a of the connecting passage 155, and orthogonal to a second branch 155b of the connecting passage 155. Thus, a user may be able to determine the position of each of the first branch 155a and second branch 155b when the pin seat 150 is threaded into the coupler housing 131 by observing the position of the slot 156. The user may further be able to determine the position of the air inlet passage 135 of the coupler housing 131 by observing the position of the air source attachment member 132, and align at least one of the first branch 155a and the second branch 155b with the air inlet passage 135 by aligning the slot 156 with (in parallel with or orthogonal to) the air source attachment member 132. Fluid communication may thus be achieved from the air source (not shown), through the air source attachment member 132 and the air passage 135, through the connecting passage 155, and into the central passage 161 of the inflation pin 160 (and subsequently into the valve stem 101 when the valve coupler 131 is engaged therewith). In some embodiments, the coupler housing 131 may have a space around the connecting passage, such that each of the branches of the connection passage are in fluid communication with the air inlet passage 135.

The proximal end 151 of the pin seat 150 may comprise a pin receiver 157, the pin receiver 157 comprising a passage substantially co-axial with a central axis of the coupler housing 131 and with the central passage 102 of the valve stem 101. The pin receiver 157 may be operable to receive a first end 162 of the inflation pin 160, the pin receiver 157 having an inner diameter complementary to an outer diameter of the inflation pin 160. Along with a sealing ring 133 of the coupler housing 131, the pin receiver 157 may be operable to hold the inflation pin 160 in a substantially static manner when the first end 162 thereof is engaged with (e.g., inserted into) the pin receiver 157.

Figure 4:
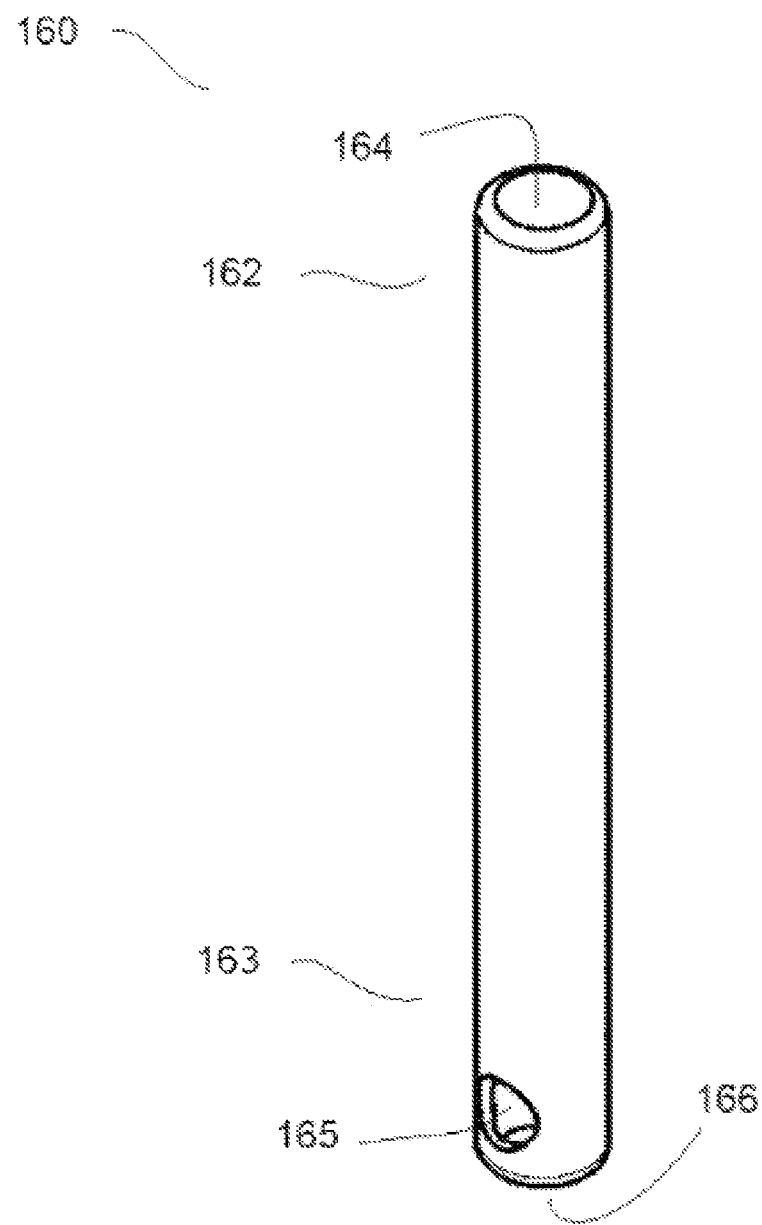
FIG. 4 provides a perspective view of an inflation pin of an improved pneumatic valve system, according to an embodiment of the present invention.

As best seen in FIG. 4, the inflation pin 160 may comprise a substantially cylindrical shape defining a central passage 161, the central passage 161 having an inlet 164 at a proximal end 162 of the inflation pin 160, and an outlet 165 at a distal end 163 of the inflation pin 160. The proximal end 162 may be operable to be inserted into the pin receiver 157 of the pin seat 150 and may be in fluid communication with the connecting passage 155. When engaging the valve coupler 130 with the valve stem 101, the second end 163 of the inflation pin 160 may be operable to be inserted into and to pass through the pin passage 114 of the valve cap 110, and may thereby pass into the central passage 102 of the valve stem 101. The outlet 165 may be arranged on a lateral outer surface of the distal end 163, rather than on a leading surface 166, the leading surface 166 therefore being free to contact and push the sealing member 120 away from the sealing ring 116 as the inflation pin 160 enters the valve stem 101, without blocking an air flow out of the outlet 165.

The coupler housing 131 of the valve coupler 130 may comprise an air source attachment member 132, a threading 136 for attaching to the pin seat 150, and a collar 140 for attaching to the valve cap 110. The coupler housing 131 may comprise a rigid material (i.e., a metal, a metal alloy, a plastic, a carbon fiber, and the like) and a generally cylindrical shape (see FIG. 5B) having a central passage 137 which is substantially co-axial with the central passage 102 of the valve stem 101 when the valve coupler 130 is engaged with the valve stem 101. The central passage 137 of the coupler housing 131 may have an inner surface having a threading 136 for securing the pin seat 150 in place in the central passage 137. The coupler housing 131 may comprise a first sealing ring 133 and a second sealing ring 134, the first sealing ring 133 being positioned to create an airtight seal between the distal end 151 of the pin seat 150 and a first shoulder 138 of the coupler housing 131 when the pin seat 150 is threaded into the coupler housing 131. The second sealing ring 134 may be positioned to create an airtight seal between the proximal end 152 of the pin seat 150 and a second shoulder 139 of the coupler housing 131.

The air source attachment member 132 may comprise a plurality of outer circumferential barbs, and may be operable to be inserted into a central passage of a pneumatic hose (not shown). The central passage of the pneumatic hose may be substantially elastic and operable to create an airtight connection with the plurality of barbs of the air source attachment member 132.

The valve coupler 130 may comprise a plurality of ball bearings 141 nested in a plurality of passages 142 traversing the wall of the collar 140, each of the plurality of ball bearings 141 being inwardly biased by the elastic bearing sleeve 170 enveloping the collar 140. The plurality of passages 142 in the wall of the collar 140 may comprise an outer end which defines an opening in an outer surface of the collar 140, and an inner end which defines an opening in an inner surface of the collar 140 (see FIG. 5A). Each passage 142 may comprise a substantially cylindrical shape except that the inner end is narrowed in comparison to the rest of the passage (i.e., the inner end has a smaller diameter than the rest of the passage). Each ball bearing 141 may have an outer diameter substantially greater than a diameter of the inner end of the passage 142, and substantially greater than the thickness of the wall of the collar 140 (see FIG. 1A), such that the ball bearing 141 cannot pass completely through the passage 142, but a portion of the ball bearing 141 may protrude through the narrowed end of the passage 142. Because the ball bearing 141 is wider than the wall of the collar 140, the elastic sleeve 170 will contact and elastically bias the ball bearing 141 toward the inner end of the passage 142. The ball bearing 142 may thus extend into the circumferential concavity 113 of the valve cap 110 when the valve coupler 130 is engaged with the valve stem 101 (see FIG. 1B), securing the valve coupler 130 in place on the valve stem 101.

The valve coupler 130 may be engaged with the valve stem 101 by simply aligning the collar 140 with the valve cap 110 and applying linear force against the valve coupler (toward the valve stem) with one hand. As seen in FIG. 1B, this action may cause the collar 140 to slide down over and engage with the valve cap 110. The force applied against the valve coupler 130 must be sufficient to: 1) cause the ball bearings 141 of the collar 140 to move outwardly against the inward force of the elastic sleeve 170 in order to slide over an upper lip 117 of the valve cap 110 before moving back inwardly into the circumferential concavity 113, and 2) cause the second end 163 of the inflation pin 160 to insert through the center of the sealing ring 116 and disengage the sealing member 120 from the sealing ring 116 against the force of the biasing member 125, such that the outlet 165 of the inflation pin 160 moves past the sealing ring 116 and into the fluid communication with the central passage 102 of the valve stem 101.

Figure 6:
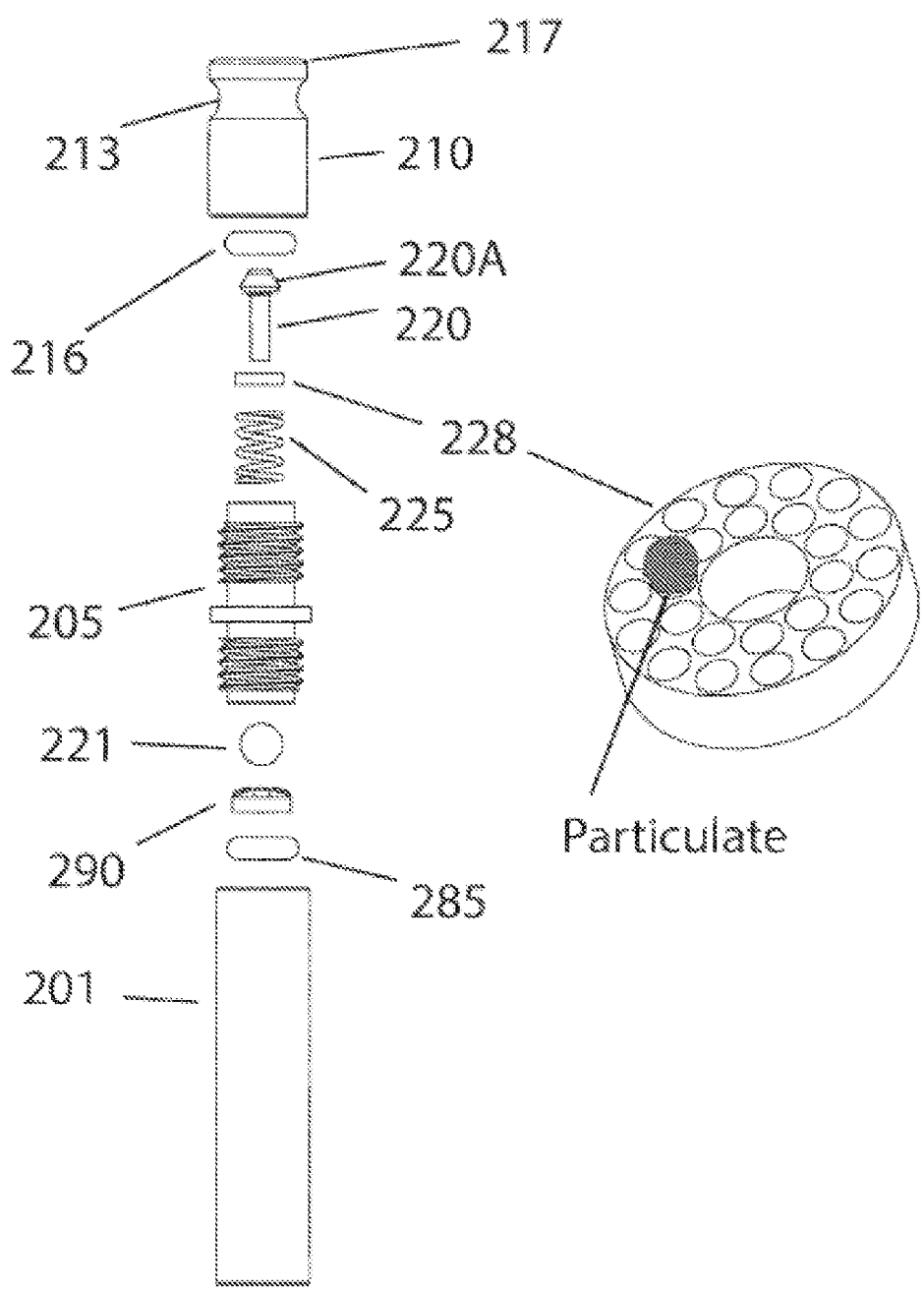
FIG. 6 provides an exploded view of an improved pneumatic valve system, according to an embodiment of the present invention.
Figure 7A:
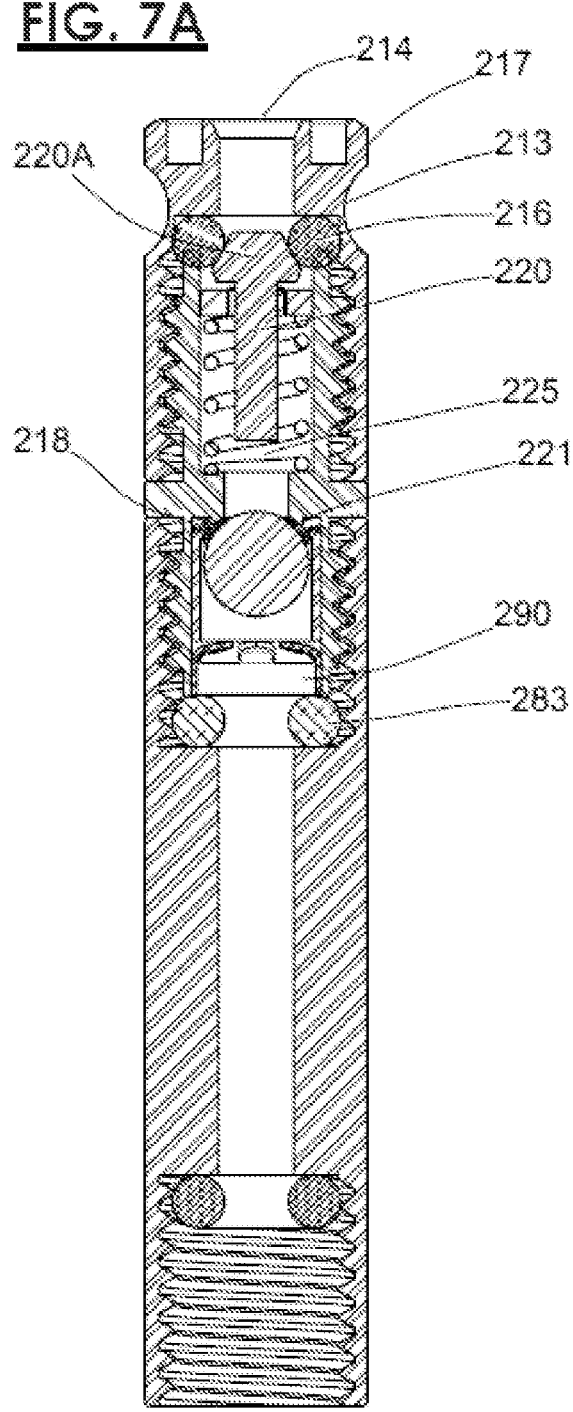
FIG. 7A provides a cross-sectional view of an improved pneumatic valve system, according to an embodiment of the present invention.
Figure 7B:
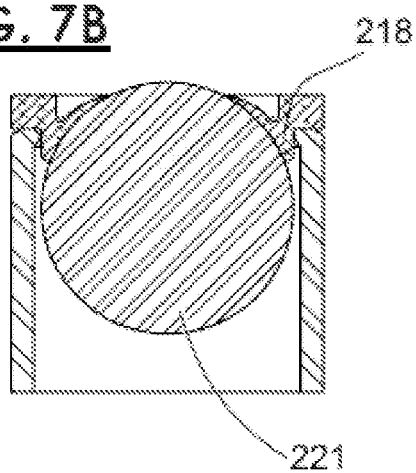
FIG. 7B provides a cross-sectional view of valve mechanism components an improved pneumatic valve system, according to an embodiment of the present invention.
Figure 7C:
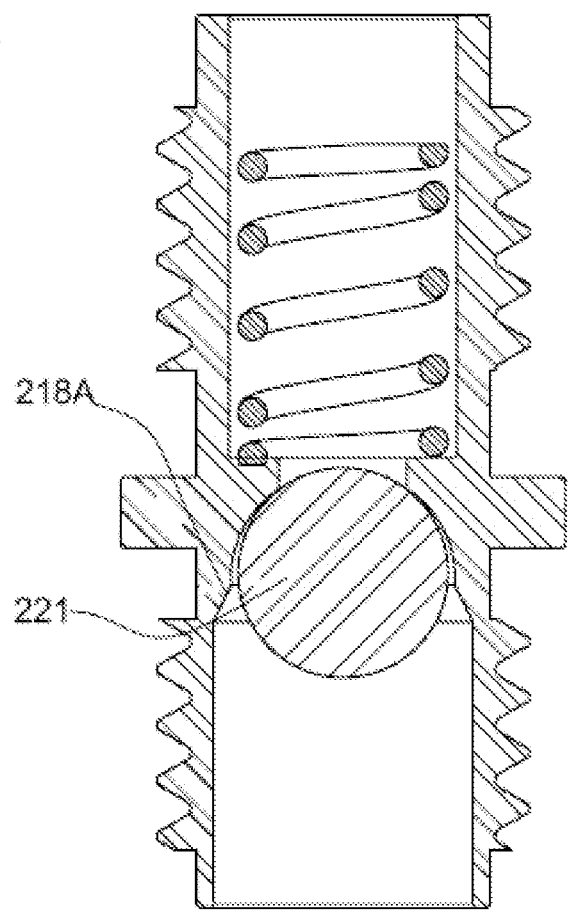
FIG. 7C provides a cross-sectional view of valve mechanism components an improved pneumatic valve system, according to an embodiment of the present invention.

FIGS. 6-8 illustrate an additional embodiment of a pneumatic valve system for easily attaching and sealing a valve coupler to a valve stem that includes two independent seals. As seen in FIG. 6, the valve system 200 may comprise the following major components: a valve stem 201, a valve cap 210, a first chamber 281 that includes a first sealing member 220 biased by a biasing member 225, a second chamber 282 that includes a second sealing member 221, a dual-seal valve core 285 defining the connection between the two chambers 281 and 282, and a valve coupler 130 as described above, having a coupler housing 131, a pin seat 150, an inflation pin 160, and an elastic sleeve 170. The two independent sealing mechanisms in two separate chambers 281 and 282 eliminate the pressure loss that occurs in conventional valve designs when the pump-head is decoupled from the valve stem, which can be significant (e.g., up to 10 PSI). The upper chamber 281 may include a sealing ring 216 against which a first sealing member 220 is pressed when in a closed position, and the lower chamber 282 may include a sealing seat 286.

The first sealing member 220 may be a sealing rod having a tapering plug 220a at its upper end that engages with the sealing ring 216 when in a closed position. A biasing spring 225 may be positioned in the upper chamber 281 and engaged with the sealing rod 220 and may bias the sealing rod 220 toward the sealing member 216. The sealing rod 220 may be engaged with the biasing spring 225 by having a portion nested within the spring 225. The bottom end of the biasing spring 225 may be seated on a shoulder 206 of the dual-seal valve core 285 at the lower end of the first chamber 281. A filter 228 may be included in the upper chamber 281 that is operable to catch particulate matter and prevent the introduction of particulates into the valve stem 201 or an inflatable vessel to which it is attached. The particulate filter 228 may have a ring structure that is positioned around the shaft of the sealing rod 220 between the plug 220a and the biasing spring 225 such that it is maintained in a position adjacent to the plug 220a. The particulate filter 228 may be a metal mesh material or a perforated metal disk (e.g., laser-perforated stainless steel, aluminum, or other rigid material).

The valve cap 210 may comprise a lower end 211 and an upper end 212. The lower end 211 may comprise a substantially cylindrical shape and an inner surface having a threading 215 complementary to the threading 205 of the upper end 204 of a dual seal valve core that is positioned between the two chambers 281 and 282. stem 201, allowing the upper end 211 of the valve cap 210 to securely attach to the upper end 204a of the dual-seal valve core 285 in an air-tight manner. The upper end 212 of the valve cap 210 may comprise an outer surface having a rounded circumferential concavity 213 for removably attaching to the valve coupler 130, and a pin passage 214 substantially coaxial with the dual-seal valve core 285 and the valve stem 201. The pin passage 214 may comprise a diameter complementary to a diameter of the inflation pin 160, such that the inflation pin 160 may pass through the pin passage 214 and into the valve stem 201.

The sealing ring 216 of the valve cap 210 may have a circular shape and a substantially circular or ovoid cross-sectional shape, and may comprise an elastomeric material. The sealing ring 216 may have an outer diameter complementary to an inner diameter of the valve cap 210, and the sealing ring 216 may have an inner diameter substantially smaller than an outer diameter of the sealing plug 220a, such that the sealing ring 216 may provide a stop against which the sealing member 220 is biased by the biasing member 225. The sealing ring 216 may be positioned between the upper circumference of the dual-seal valve core 285 and a shoulder 212 of the valve cap 210. When the valve coupler 130 is not engaged with the valve cap 210, contact between the sealing plug 220a and sealing ring 216 forms an airtight seal against the air pressure in the vessel. An inner diameter of the sealing ring 216 may be less than or equal to an outer diameter of the inflation pin 160, such that inflation pin 160 may pass through the sealing ring 116 (which may deform or stretch slightly to allow passage of the inflation pin 160), forming an airtight seal between the inflation pin 160 and the sealing ring 216 against the air pressure inside the vessel.

The second chamber 282 may include a second sealing mechanism that includes a sealing member 221, which may be a substantially spherical rigid ball (e.g., stainless steel, aluminum, or other non-corrodible material) that engages with a complementary seat 218 that provides a relatively large surface area interface between the sealing member 221 and the complementary seat 218. The complementary seat 218 may have a spherical cap shape comprised of flexible thermoplastic, Buna-N Nitrile, gum rubber, Hypalon™, Neoprene™, polyurethane, SBR (red rubber), silicone, Viton™, fluorosilicone, ethylene propylene, butyl, or other materials. The material can be somewhat flexible such that it flexes when the sealing member 221 against the seat 218 by the internal pressure of the pressurized vessel. The second chamber 282 may or may not include a biasing member. The sealing member 221 in the second chamber 282 may be held in place in the seat 218 by the pneumatic pressure in the vessel to which the valve stem 201 is connected.

In other embodiments, the seat 218 may be a tri-point ball seat 218a. The tri-point seat 218a is composed of fused or integrally molded portions of two spherical caps, one having a cross-sectional area that is 10-15% larger than that of the sealing ball 221 and the other spherical cap may have a cross-sectional that is 10-15% smaller than that of the sealing ball 221. The spherical caps may be axially aligned with the smaller of the two position over the larger, with a passage in the small spherical cap to allow the passage of air or other gases through the valve. The tri-point seat 218a may be made from high tensile strength, high hardness metal.

The seat 218 (or 218a) may be positioned on the inferior side of the shoulder 206 of the dual-seal valve core 285, within the second chamber 282. The dual seal valve core 285 may be positioned between the inferior portion of the valve cap 210 and the upper portion of the valve stem 201 by threaded or other mechanical connections. The dual-seal valve core 285 may include a lower threaded portion 285b that connects to threaded receiver 205 in the upper portion of the valve stem 201. The threaded receiver 205 may have a shape complementary to the shape of lower threaded portion 285b. The valve stem 201 may be attached to and in fluid communication with a pressurizable vessel (e.g., a bicycle tire tube), and may act as an inlet and outlet for the vessel.

A gasket 283 may be positioned between the lower threaded portion 285b and a shoulder 203 at the lower aspect of threaded receiver of the valve stem 201. A washer 290 may positioned over the gasket 283. The washer 290 may prevent the sealing member 221 from seating in the lower passage of the second chamber during inflation. This "stand-off" washer 290 may be a cage-like structure or may have leaf-like projections that allow the passage of air or other inflation gas around the washer 290 when the sealing member 221 is in contact with the washer 290. The washer 290 may have an outer diameter substantially equal to the inner diameter of the lower threaded portion 285b of the dual-seal valve core 285, such that the washer may be maintained in position over the gasket 283.

The valve coupler 130 may be engaged with the valve cap 210 by simply aligning the collar 140 with the valve cap 210 and applying linear force against the valve coupler (toward the valve stem) with one hand. As seen in FIG. 8, this action may cause the collar 140 to slide down over and engage with the valve cap 210. The force applied against the valve coupler 130 must be sufficient to: 1) cause the ball bearings 141 of the collar 140 to move outwardly against the inward force of the elastic sleeve 170 in order to slide over an upper lip 217 of the valve cap 210 before moving back inwardly into the circumferential concavity 213, 2) cause the second end 163 of the inflation pin 160 to insert through the center of the sealing ring 216 and disengage the sealing rod 220 from the sealing ring 216 against the force of the biasing member 225, such that the outlet 265 of the inflation pin 160 moves past the sealing ring 216 and into the fluid communication with the interior of the first chamber 281; and 3) cause the lower end of the sealing rod 220 to engage with the second sealing member 221 in the second chamber 282 and displace the second sealing member 221 from the seat 218 opening the second seal of the valve 200. Air or other gas may then flow through inflation needle 160 into the first chamber 281 and then through the passage between the first and second chambers and through the second chamber 282 to inflate the vessel.+

Figure 10:
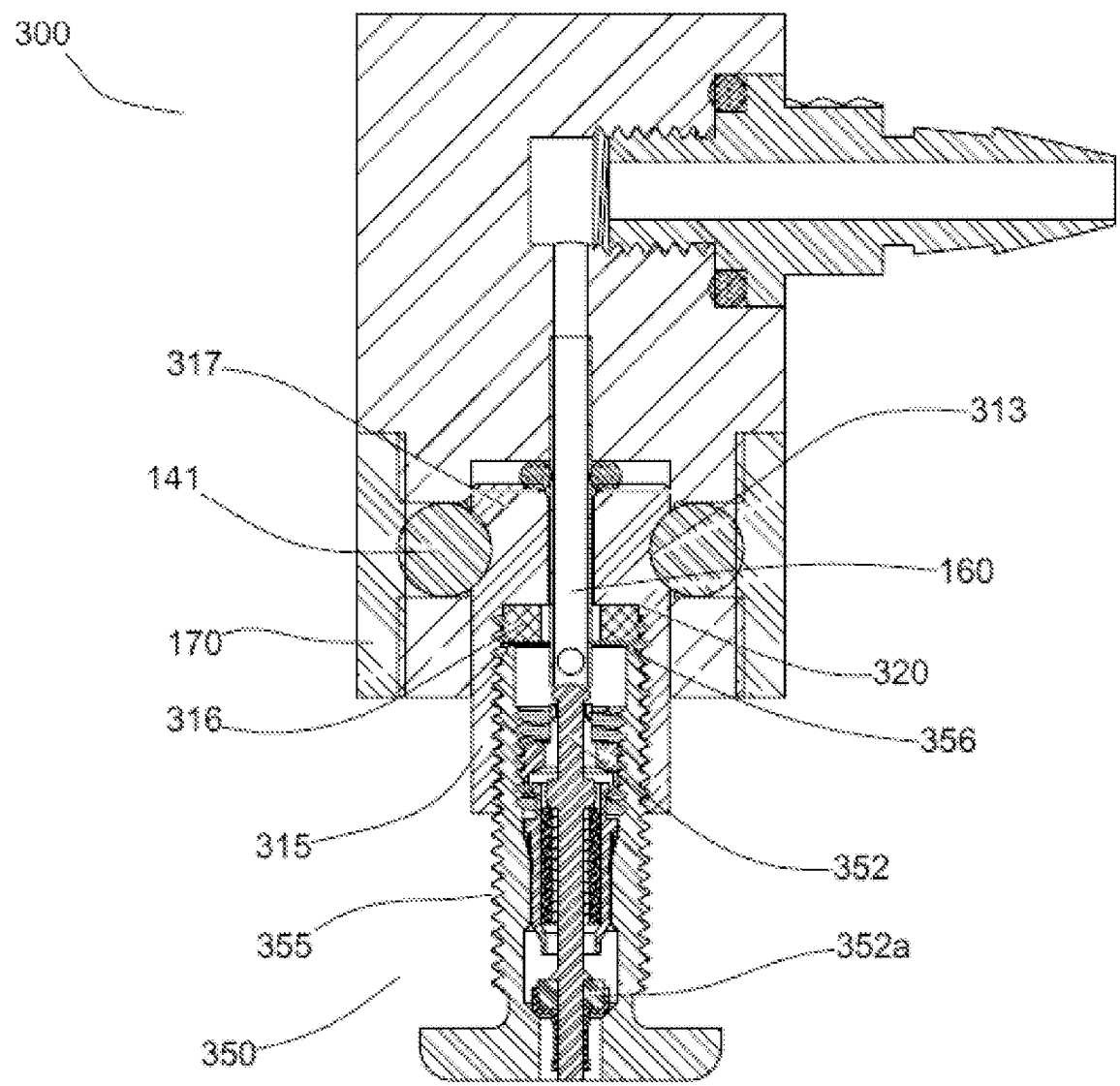
FIG. 10 provides a cross-sectional view of a pneumatic valve adapter system, according to an embodiment of the present invention.
Figure 11:
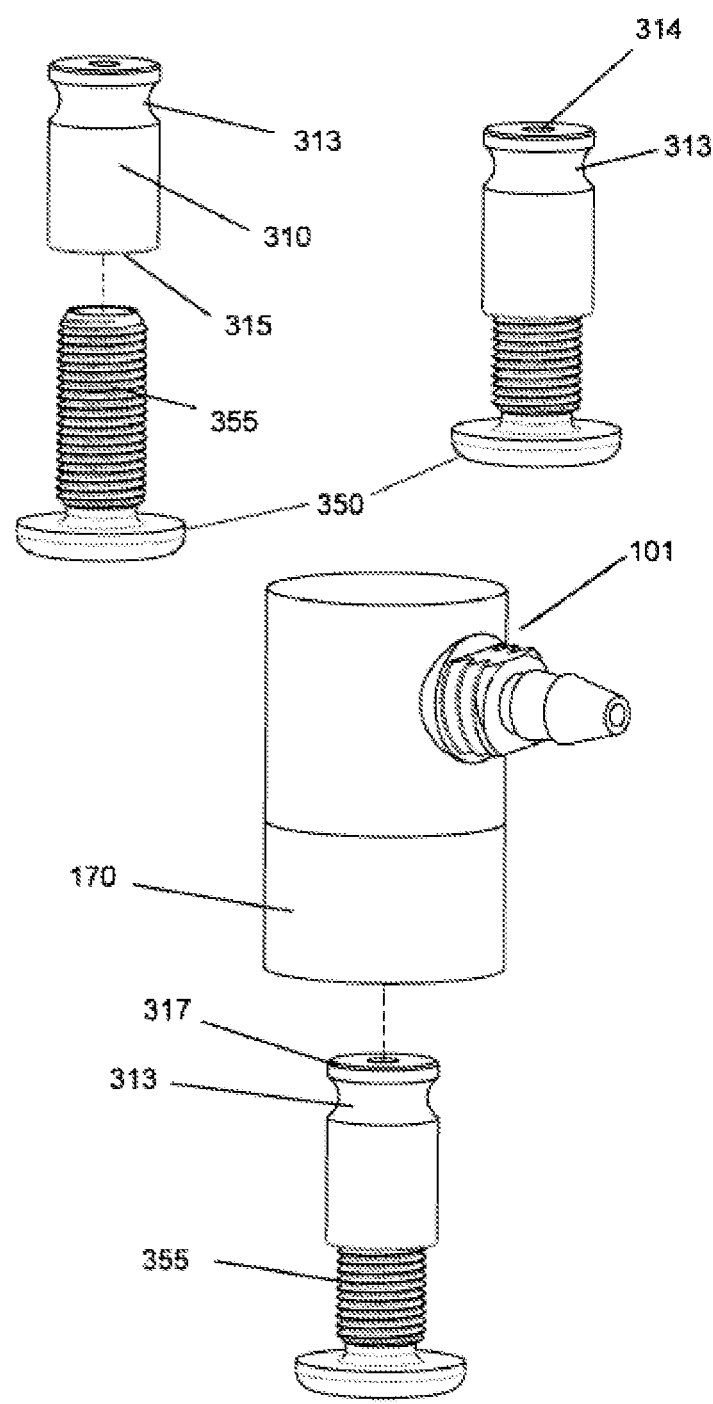
FIG. 11 provides perspective views of a pneumatic valve adapter system, according to an embodiment of the present invention.

FIGS. 9-11 illustrate an additional embodiment of a pneumatic valve adapter system 300 for easily attaching and sealing a valve coupler 130 to a pre-existing valve stem 301 with an adapter device 310 attached thereto. The valve adapter system 300 is operable for use with existing pneumatic valve systems (e.g., a Schrader valve). As seen in FIG. 10, the valve adapter system 300 may comprise the following major components: a valve stem adapter 310, a pin passage 314 for accepting an actuating pin from the pump-head assembly, sealing gasket 316, and a valve coupler 130 as described above, having a coupler housing 131, a pin seat 150, an inflation pin 160, and an elastic sleeve 170.

Conventional Schrader valves include an actuation pin that is pressed when a conventional pump-head is attached thereto. The movement of the actuation pin displaces a plug at the lower end of the actuation pin to open the valve. As shown in FIGS. 10-11, the adapter device 310 of the present invention has a threaded female receiver 315 that is complementary to the exterior male threading 355 of a conventional Schrader valve 350 and operable to securely threaded onto the Schrader valve stem 350 in an air-tight manner. A sealing gasket 316 may be positioned between an internal shoulder 320 of the adapter device 310 and the upper rim 356 of the Schrader valve stem. The sealing gasket 316 may have a circular shape, and may comprise an elastomeric material.

The sealing gasket 316 may have an outer diameter complementary to an inner diameter of the adapter device 310 and an inner diameter less than or equal to an outer diameter of the inflation pin 160, such that inflation pin 160 may pass through the sealing gasket 316 (which may deform or stretch slightly to allow passage of the inflation pin 160), forming an airtight seal between the inflation pin 160 and the sealing gasket 316 against the air pressure inside a pneumatic vessel to which the Schrader valve 350 is attached.

The adapter device 310 may comprise an outer surface having a rounded circumferential concavity 313 for removably attaching to the valve coupler 130, and a pin passage 314 substantially coaxial with the actuator pin 352 of the Schrader valve stem 350. The pin passage 314 may comprise a diameter complementary to a diameter of the inflation pin 160, such that the inflation pin 160 may pass through the pin passage 314 and contact the actuator pin 352 of the Schrader valve stem 350.

The valve coupler 130 may be engaged with the adapter device 310 by simply aligning the collar 140 with the adapter device 310 and applying linear force against the valve coupler (toward the adapter device 310) with one hand. As shown in FIG. 10, this action may cause the collar 140 to slide down over and engage with the adapter device 310. The force applied against the valve coupler 130 must be sufficient to 1) cause the ball bearings 141 of the collar 140 to move outwardly against the inward force of the elastic sleeve 170 in order to slide over an upper lip 317 of the adapter device 310 before moving back inwardly into the circumferential concavity 313, and 2) cause the inflation pin 160 to insert through the center of the gasket 316 and displace the actuator pin 352 and a sealing plug 352a at its lower end to open the Schrader valve 350. Air or other gas may then flow through inflation needle 160 and then through the Schrader valve 350 to inflate the vessel.

Figure 12A:
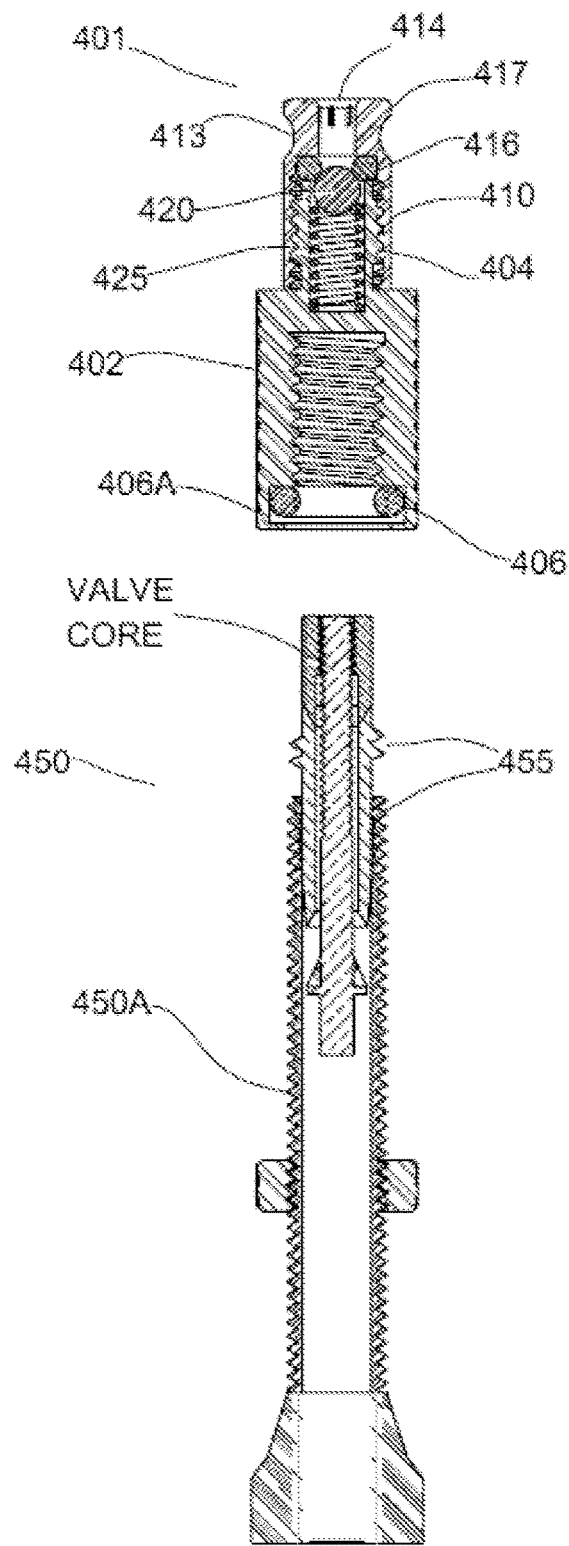
FIG. 12A provides a cross-sectional view of a pneumatic valve adapter system, according to an embodiment of the present invention.
Figure 12B:
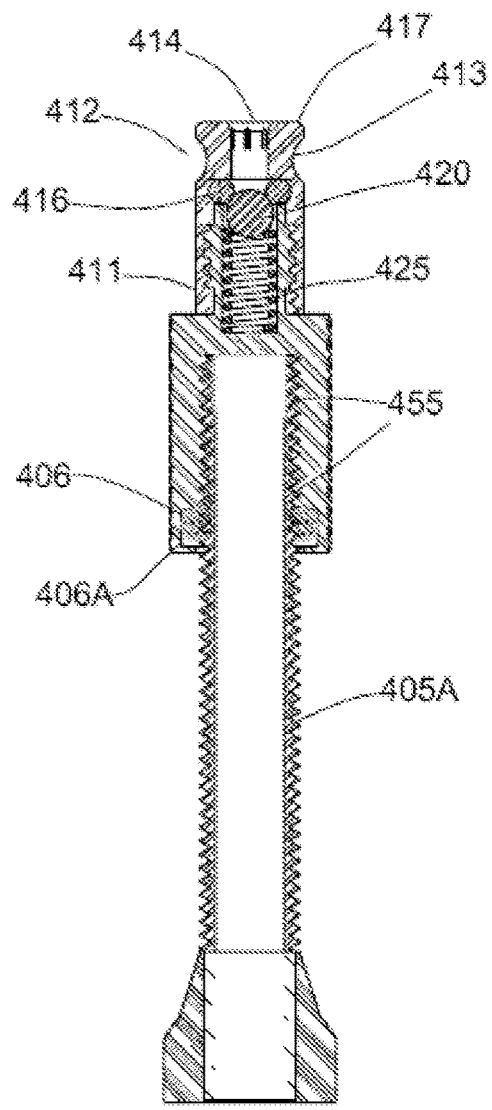
FIG. 12B provides a cross-sectional view of a pneumatic valve adapter system, according to an embodiment of the present invention.
Figure 13:
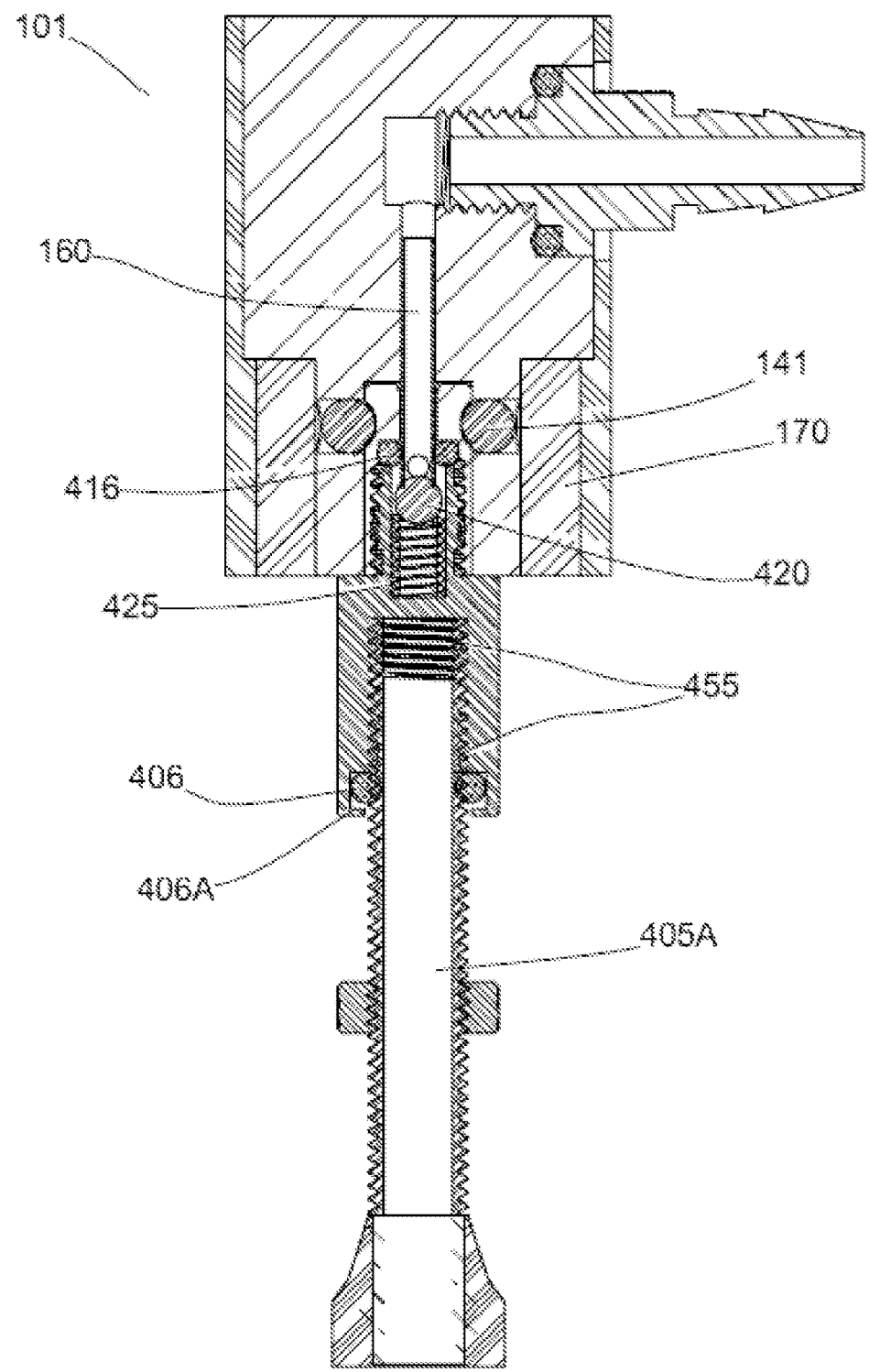
FIG. 13 provides a cross-sectional view of a pneumatic valve adapter system, according to an embodiment of the present invention.

FIGS. 12A-13 illustrate an additional embodiment of a pneumatic valve adapter system 400 for easily attaching and sealing a valve coupler 130 to a pre-existing valve stem 401 with an adapter device 410 attached thereto. The valve adapter system 400 is operable for use with existing pneumatic valve systems (e.g., a Presta valve, Dunlop valve, or Schrader valve). As seen in FIG. 12B, the valve adapter system 400 may comprise the following major components: 1) a valve stem adapter 410 having a pin passage 414 for accepting an inflation pin 160 from the pump-head assembly 100, a sealing gasket 416, and 2) a pump-head 100 having a valve coupler 130 as described above with a coupler housing 131, a pin seat 150, an inflation pin 160, and an elastic sleeve 170.

The valve core of conventional valves (e.g., a Presta valve) can be removed, eliminating the valve actuation mechanism. An adapter device 401 may then be attached to the remaining stem of the conventional valve with valve mechanism according to the present invention. As shown in FIGS. 12A-12B, the adapter device 401 of the present invention may have a stem connector 402 that has a threaded female receiver 403 that is complementary to the exterior male threading 455 of a conventional valve 450 and operable to securely threaded onto the valve stem 450a in an air-tight manner. A sealing gasket 406 may be positioned between a recess 406a of the stem connector 402 and the outer diameter of the conventional valve stem 450a. The sealing gasket 406 may prevent pressured air from escaping from the valve adapter 401 during inflation or otherwise. The stem connector 402 also includes an upper male connector 404 that may connect to an adapter cap 410.

The adapter cap 410 may comprise a proximal end 411 and a distal end 412. The lower end 411 may comprise a substantially cylindrical shape and an inner surface having a threading 415 complementary to threading of the upper male connector 404 of the stem connector 402, allowing the lower end 411 of the adapter cap 410 to securely attach to the upper male connector 404 of the stem connector 401 in an air-tight manner.

The distal end 412 of the adapter cap 410 may comprise an outer surface having a rounded circumferential concavity 413 for removably attaching to the valve coupler 130, and a pin passage 414 substantially coaxial with the conventional valve stem 450. The pin passage 414 may comprise a diameter complementary to a diameter of the inflation pin 160, such that the inflation pin 160 may pass through the pin passage 414 and into the interior of the adapter cap. A sealing mechanism may be positioned between the upper male connector 404 and the adapter cap 410. The stem connector 401 has a shoulder 405 in the interior diameter of the upper male connector 404. A biasing member 425 (e.g., a spring) may be positioning within the male connector 404 with its lower end seated on shoulder 405. A sealing member 420 may be positioned above the biasing member 425 such that the biasing member biases the sealing member toward the pin passage 414 in adapter cap 410.

A sealing ring 416 of the valve cap 410 may have a circular shape and a substantially circular or ovoid cross-sectional shape, and may comprise an elastomeric material. The sealing ring 416 may have an outer diameter complementary to an inner diameter of the adapter cap 410, and the sealing ring 416 may have an inner diameter substantially smaller than an outer diameter of the sealing member 420, such that the sealing ring 416 may provide a stop against which the sealing member 420 is biased by the biasing member 425. When the adapter cap 410 is not engaged with the valve coupler 130, contact between the sealing member 420 and sealing ring 416 forms an airtight seal against the air pressure in a pneumatic vessel to which the valve stem 450 is attached. An inner diameter of the sealing ring 416 may be less than or equal to an outer diameter of the inflation pin 160, such that inflation pin 160 may pass through the sealing ring 416 (which may deform or stretch slightly to allow passage of the inflation pin 160), forming an airtight seal between the inflation pin 160 and the sealing ring 416 against the air pressure inside the pneumatic vessel.

The valve coupler 130 may be engaged with the adapter device 410 by simply aligning the collar 140 with the adapter cap 410 and applying linear force against the valve coupler (toward the adapter cap 410) with one hand. As shown in FIG. 13, this action may cause the collar 140 to slide down over and engage with the adapter cap 410. The force applied against the valve coupler 130 must be sufficient to 1) cause the ball bearings 141 of the collar 140 to move outwardly against the inward force of the elastic sleeve 170 in order to slide over an upper lip 417 of the adapter cap 410 before moving back inwardly into the circumferential concavity 413, and 2) cause the inflation pin 160 to insert through the center of the sealing ring 416 and displace the sealing member 420 to open valve mechanism. Air or other gas may then flow through inflation needle 160 and then through the adapter device 401.

Figure 15:
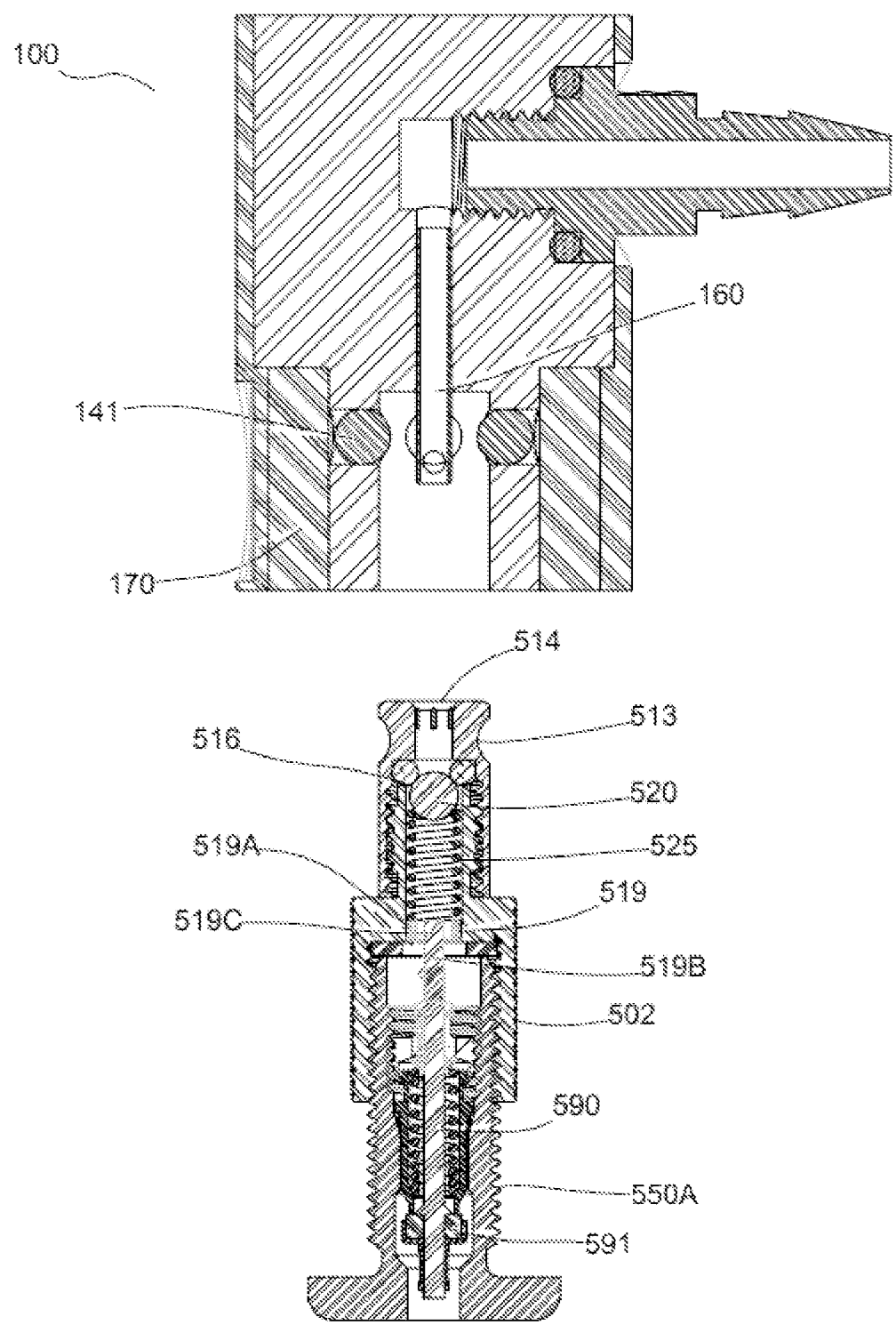
FIG. 15 provides a cross-sectional view of a pneumatic valve adapter system, according to an embodiment of the present invention.

FIGS. 14A-15 illustrate an additional embodiment of a pneumatic valve adapter system 500 for easily attaching and sealing a valve coupler 130 to a pre-existing valve stem 501 with an adapter device 510 attached thereto. The valve adapter system 500 is operable for use with existing pneumatic valve systems (e.g., a Schrader valve, Presta valve, and others). As seen in FIG. 14B, the valve adapter system 500 may comprise the following major components: 1) a valve stem adapter 501 having a pin passage 514 for accepting an inflation pin 560 from the pump-head assembly 100, a sealing gasket 516, and 2) a pump-head 100 having a valve coupler 130 as described above with a coupler housing 131, a pin seat 150, an inflation pin 160, and an elastic sleeve 170.

The adapter device 501 may include an engagement member 519 for engaging the actuation pin 590 of a conventional valve stem 550, which is operable to hold the conventional valve stem in an open position when the adapter device 501 is attached to the conventional valve stem 550. The valve mechanism of the adapter device 501 may then exclusively control the flow of fluid from the adapter device 501 to through the conventional valve stem 550. The engagement member may include a engagement plate 519a that substantially perpendicular to the path of fluid through the adapter device 501 and the engagement plate 519a may have perforations 519b therein for allowing the passage of fluid therethrough. The engagement plate 519 may also include an inferior protrusion that extend downward to meet an actuate an actuation pin 590 of the conventional valve stem 550. When the adapter device is attached to the pre-existing valve stem 550a, the actuation pin 590 is displaced inferiorly, thereby displacing plug 591 and allowing fluid to pass through the pre-existing valve stem 550.

The adapter device 501 may be attached to the conventional valve stem of the conventional valve with valve mechanism according to the present invention. As shown in FIGS. 14A-14B, the adapter device 501 of the present invention may have a stem connector 502 that has a threaded female receiver 503 that is complementary to the exterior male threading 555 of a conventional valve 550 and operable to securely threaded onto the valve stem 550a in an air-tight manner. A sealing gasket 506 may be positioned between a recess 506a of the stem connector 502 and the outer diameter of the conventional valve stem 550a. The sealing gasket 506 may prevent pressured air from escaping from the valve adapter 501 during inflation or otherwise. The stem connector 502 also includes an upper male connector 504 that may connect to an adapter cap 510.

The adapter cap 510 may comprise a proximal end 511 and a distal end 512. The lower end 511 may comprise a substantially cylindrical shape and an inner surface having a threading 515 complementary to threading of the upper male connector 504 of the stem connector 502, allowing the lower end 511 of the adapter cap 510 to securely attach to the upper male connector 504 of the stem connector 501 in an air-tight manner.

The distal end 512 of the adapter cap 510 may comprise an outer surface having a rounded circumferential concavity 513 for removably attaching to the valve coupler 130, and a pin passage 514 substantially coaxial with the conventional valve stem 550. The pin passage 514 may comprise a diameter complementary to a diameter of the inflation pin 160, such that the inflation pin 160 may pass through the pin passage 514 and into the interior of the adapter cap 510. A sealing mechanism may be positioned between the upper male connector 504 and the adapter cap 510. The stem connector 501 has a shoulder 505 in the interior diameter of the upper male connector 504. A biasing member 525 (e.g., a spring) may be positioning within the male connector 504 with its lower end seated on shoulder 505. A sealing member 520 may be positioned above the biasing member 525 such that the biasing member biases the sealing member toward the pin passage 514 in adapter cap 510.

A sealing ring 516 of the valve cap 510 may have a circular shape and a substantially circular or ovoid cross-sectional shape, and may comprise an elastomeric material. The sealing ring 516 may have an outer diameter complementary to an inner diameter of the adapter cap 510, and the sealing ring 516 may have an inner diameter substantially smaller than an outer diameter of the sealing member 520, such that the sealing ring 516 may provide a stop against which the sealing member 520 is biased by the biasing member 525. When the adapter cap 510 is not engaged with the valve coupler 130, contact between the sealing member 520 and sealing ring 516 forms an airtight seal against the air pressure in a pneumatic vessel to which the valve stem 550 is attached. An inner diameter of the sealing ring 516 may be less than or equal to an outer diameter of the inflation pin 160, such that inflation pin 160 may pass through the sealing ring 516 (which may deform or stretch slightly to allow passage of the inflation pin 160), forming an airtight seal between the inflation pin 160 and the sealing ring 516 against the air pressure inside the pneumatic vessel.

The valve coupler 130 may be engaged with the adapter device 510 by simply aligning the collar 140 with the adapter cap 510 and applying linear force against the valve coupler (toward the adapter cap 510) with one hand. As shown in FIG. 15, this action may cause the collar 140 to slide down over and engage with the adapter cap 510. The force applied against the valve coupler 130 must be sufficient to 1) cause the ball bearings 141 of the collar 140 to move outwardly against the inward force of the elastic sleeve 170 in order to slide over an upper lip 517 of the adapter cap 510 before moving back inwardly into the circumferential concavity 513, and 2) cause the inflation pin 160 to insert through the center of the sealing ring 516 and displace the sealing member 520 to open valve mechanism. Air or other gas may then flow through inflation needle 160 into the adapter device 501, through the perforations 519a of the engagement plate 519, and then through the pre-existing valve stem 550a.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A pneumatic valve assembly, comprising:
 a) a valve stem that includes:
  a. a cap member having a pin passage with a first diameter;
  b. a stem member removably and sealingly coupled to the cap member, the stem member having a second passage with a second diameter, the first diameter being smaller than the second diameter;
  c. a biasing element disposed in the second passage,
  d. a sealing member at least partially disposed in the second passage, the sealing member having a third diameter, the third diameter being larger than the first diameter, and
  e. a seat disposed between the sealing member and the pin passage, wherein said sealing member is biased into contact with said seat, said seat having a complementary shape to said sealing member and a third passage; and b) a pump head fluidly and removably coupled to said cap member, said pump head having an inflation pin having a fourth diameter that is equal to or greater than an inner diameter of said third passage of said seat, said pump head further comprising a housing and a sleeve extending about the periphery of and enclosing said housing, said sleeve further being fixedly coupled to said housing, said housing includes a ball lock coupling mechanism having at least one ball nested in a hole in an inner diameter of the housing, said sleeve biasing the at least one ball to protrude into the inner diameter of the housing;

wherein said at least one ball comprises a plurality of balls and said hole comprises a plurality of holes spaced about a side periphery of said housing, one of said plurality of balls being nested in a respective one of said plurality of holes; and wherein said sleeve comprises an elastic material that directly applies an inward force to each of said plurality of balls that holds each of said plurality of balls in said respective holes such that each of the balls remain protruding into the inner diameter of the housing and engaged with a receiver of said cap member when the pump head is coupled to the cap member.

2. The pneumatic valve assembly of claim 1, wherein the inflation pin forms an gastight seal with the third passage of the seat when the pump head is engaged with said cap member.

3. The assembly of claim 2, wherein the inflation pin has gas outlet adjacent a distal end thereof and disengages the sealing member from the seat when the inflation pin passes through the third passage of the seat, the gas outlet being disposed between the seat and the sealing member when the pump head is coupled to the cap member.

4. The assembly of claim 1, wherein the inflation pin is the only passage for fluid into the valve stem when the pump head is engaged with the cap member.

5. The assembly of claim 1, wherein:
the receiver is a channel formed on an outer diameter of the cap member, the channel being axially disposed between the seat and an end of the cap member; and
the pump head is secured to the valve stem by engagement of the ball lock coupling mechanism to the channel.

6. A pneumatic valve assembly comprising: a valve stem that includes: a cap member having a pin passage with a first diameter; a stem member removably and sealingly coupled to the cap member, the stem member having a second passage with a second diameter, the first diameter being smaller than the second diameter; a biasing element disposed in the second passage, a sealing member at least partially disposed in the second passage, the sealing member having a third diameter, the third diameter being larger than the first diameter, and a seat disposed between the sealing member and the pin passage, wherein said sealing member is biased into contact with said seat, said seat having a complementary shape to said sealing member and a third passage; a pump head fluidly and removably coupled to said cap member, said pump head having an inflation pin having a fourth diameter that is equal to or greater than an inner diameter of said third passage of said seat; and a second sealing mechanism in said valve stem.

7. The assembly of claim 6, wherein said second sealing mechanism includes a second sealing member and a second seat.

8. The assembly of claim 7, wherein the sealing member includes a sealing rod having a plug that engages said seat and a shaft that is operable to displace said second sealing member from said second seat when said inflation pin displaces said sealing member from said seat in a serial manner.

9. A pneumatic valve assembly for inflating a pneumatic vessel with a pneumatic pump comprising:
a valve stem that includes:
 a. a cap member having an end with a pin passage with a first diameter, the cap member further having a channel disposed about an outer diameter of the cap member,
 b. a stem member removably and sealingly coupled to the cap member, the stem member having a central passage of a second diameter, the first diameter being smaller than the second diameter,
 c. a first sealing mechanism including
  i. a sealing member at least partially disposed within the central passage and having a third diameter, the third diameter being larger than the first diameter, and
  ii. a seat arranged between the sealing member and said pin passage and positioned farther from the end than said channel, wherein said sealing member is biased against said seat to close said pin passage, said seat having a third passage having a complementary shape to said sealing member, wherein the channel is arranged between the seat and the end of the cap member; and
 d. a second sealing mechanism that includes a second sealing member and a second seat.

10. The assembly of claim 9, wherein said second sealing mechanism is positioned in serial arrangement with said first sealing mechanism.

11. The assembly of claim 9, wherein the sealing member of the first sealing mechanism is a sealing rod having a plug that engages with said seat and a shaft.

12. The assembly of claim 11, wherein the shaft of the sealing rod is operable to contact the second sealing member of said second sealing mechanism and displace said second sealing member from said second seat when said sealing member is displaced from said seat.

13. The assembly of claim 9, further comprising a particulate filter positioned between said second sealing mechanism and said first sealing mechanism.

14. The assembly of claim 9, further comprising a washer arranged between said second sealing member and a fourth passage.

15. A pneumatic valve assembly, comprising:
i. a cap member having an end with a pin passage formed therein, the pin passage having a first diameter, said cap member having a channel formed about an outer diameter of the cap member;
ii. a stem member removably and sealingly coupled to said cap member, the stem member having a central passage of a second diameter, the first diameter being smaller than the second diameter;
iii. a biasing element disposed in said central passage,
vi. a sealing member disposed in said central passage,
vii. a seat disposed between said sealing member and said pin passage, wherein said biasing element biases said sealing member against said seat, said seat having a complementary shape to said sealing member and includes a third passage having a third diameter, the third passage being aligned with said pin passage, the third diameter being smaller than the first diameter, wherein the channel is arranged between the seat and the end of the cap member;

viii. a pneumatic inflation device selectively coupleable to said cap member, said pneumatic inflation device having an inflation pin, wherein said third passage is sized to form an airtight seal about the inflation pin when the detachable pneumatic inflation device is engaged with said cap member; and ix. a second sealing mechanism disposed in said stem member, said second sealing mechanism having a sealing rod and a second seat, said sealing rod having a plug arranged to engage with said seat and a shaft and being operable to displace a second sealing member from said second seat when said inflation pin displaces said sealing member from said seat in a serial manner.

16. An assembly comprising:
a. a pneumatic vessel
b. a valve stem coupled to and extending from said pneumatic vessel that includes:
   i. a cap member having and end with a pin passage formed therein, said pin passage having a first diameter, said cap member having a channel formed on an outer diameter;
   ii. a stem member in fluid communication with said pneumatic vessel; said stem member being removably and sealingly coupled to said cap member, said stem member having a central passage of a second diameter, the first diameter being smaller than the second diameter;
   iii. a biasing element disposed in said central passage,
   iv. a sealing member disposed between the biasing element and the pin passage, and
   v. a seat disposed between the sealing member and the pin passage, the seat having a third passage having a third diameter, wherein said sealing member is biased by said biasing element against said seat to close said pin passage to the flow of pressurized gas from said pneumatic vessel, wherein the channel is arranged between the seat and the end of the cap member;
c. a pump head removably coupled to said cap member, said pump head having;
   i. an inflation pin having a fourth diameter, the fourth diameter being larger than the third diameter, said inflation pin cooperating with said seat to form an airtight seal about the inflation pin when the pump head is coupled to the cap member,
   ii. a valve coupler having a housing disposed at least partially about said inflation pin, said valve coupler includes a ball lock coupling mechanism having at least one ball nested in a hole in an inner diameter of the housing, and
   iii. an elastic sleeve coupled to and at least partially enclosing the housing, the elastic sleeve biasing the at least one ball to protrude into the inner diameter of the housing and directly apply an inward force to said at least one ball to hold said at least one ball in said hole, wherein said at least one ball is at least partially disposed within the inner diameter of the housing and is engaged with said channel when said pump head is coupled to said cap member.

17. The assembly of claim 16, further comprising a second sealing mechanism disposed in said stem member, said second sealing member having a sealing rod and a second seat, said sealing rod having a plug operable to engage with said seat and a shaft and further being operable to displace a second sealing member from said second seat when said inflation pin displaces said sealing member from said seat in a serial manner.

* * * * *